(12) United States Patent
Shekar et al.

(10) Patent No.: US 12,188,779 B2
(45) Date of Patent: Jan. 7, 2025

(54) KEYFRAME-BASED COMPRESSION FOR WORLD MODEL REPRESENTATION IN AUTONOMOUS SYSTEMS AND APPLICATIONS

(71) Applicant: NVIDIA Corporation, Santa Clara, CA (US)

(72) Inventors: Akash Chandra Shekar, Redmond, WA (US); Matthew Ashman, Redmond, WA (US); Vaibhav Thukral, Bellevue, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 301 days.

(21) Appl. No.: 17/654,382

(22) Filed: Mar. 10, 2022

(65) Prior Publication Data
US 2023/0288223 A1    Sep. 14, 2023

(51) Int. Cl.
*G01C 21/30* (2006.01)
*G01C 21/00* (2006.01)
*G05D 1/00* (2006.01)
*G06V 20/56* (2022.01)

(52) U.S. Cl.
CPC ......... *G01C 21/3819* (2020.08); *G01C 21/30* (2013.01); *G05D 1/0219* (2013.01); *G06V 20/588* (2022.01)

(58) Field of Classification Search
CPC ............... G01C 21/30; G01C 21/3658; G01C 21/3819; G05D 1/0219; G06V 10/764; G06V 10/82; G06V 20/56
See application file for complete search history.

(56) References Cited

U.S. PATENT DOCUMENTS

2019/0051056 A1\* 2/2019 Chiu ...................... G06F 16/903
2019/0384304 A1\* 12/2019 Towal .................. G05D 1/0221

\* cited by examiner

*Primary Examiner* — Charles J Han
(74) *Attorney, Agent, or Firm* — Maschoff Brennan

(57) ABSTRACT

In various examples, a method includes computing a current keyframe, the current keyframe being representative of an area around an autonomous vehicle at a current time based on map data. The method includes transforming a preceding keyframe to a coordinate frame of the autonomous vehicle at a first time prior to completing computation of the current keyframe to generate a first world model frame. The method includes transforming the preceding keyframe to the coordinate frame of the autonomous vehicle at a second time after the first time and prior to completing computation of the current keyframe to generate a second world model frame.

20 Claims, 20 Drawing Sheets

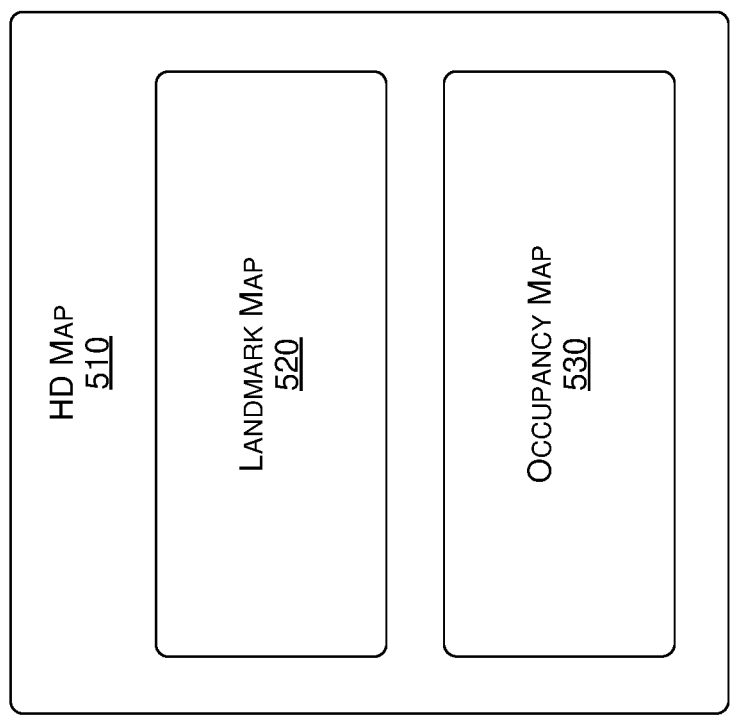

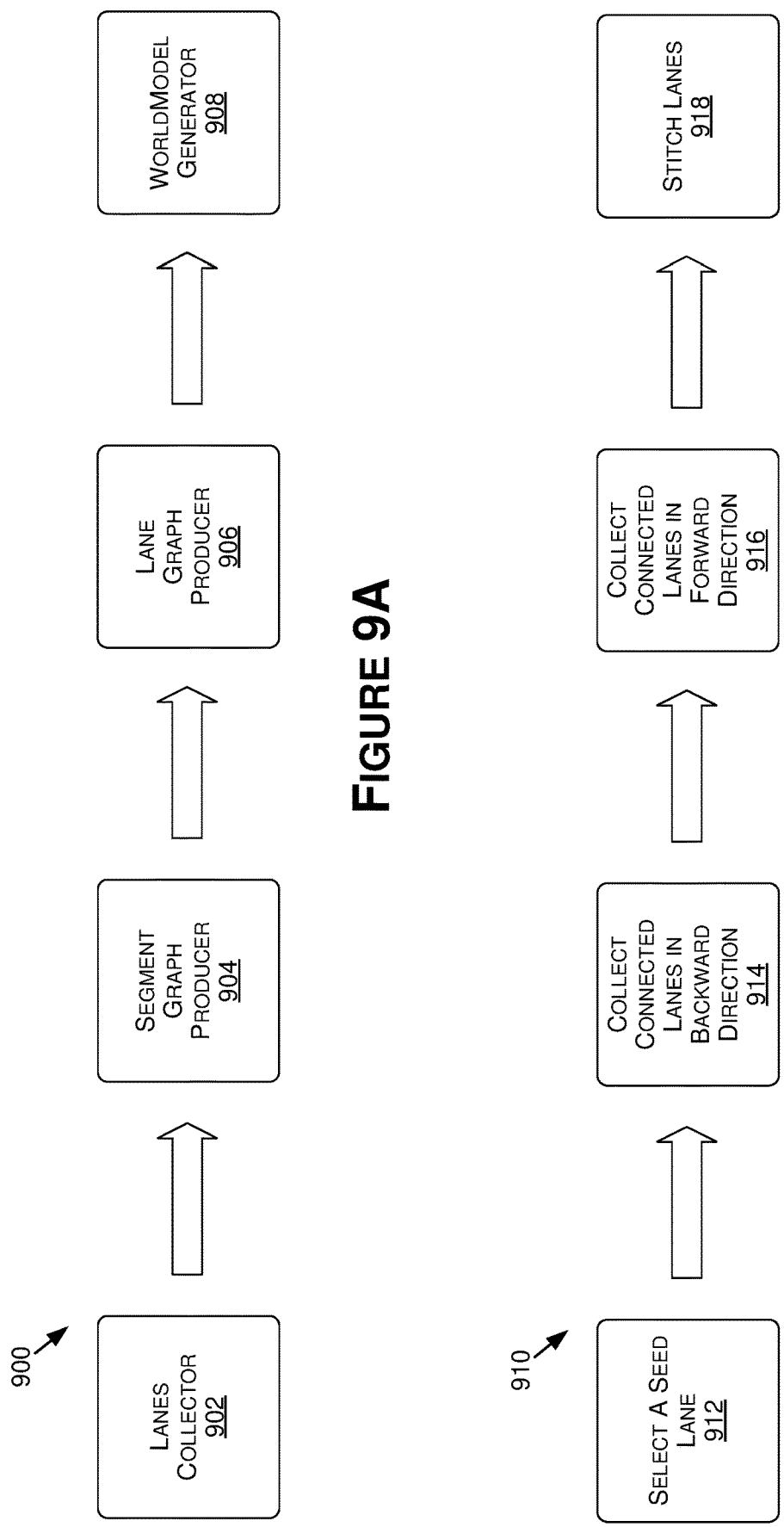

KEYFRAME-BASED COMPRESSION FOR WORLD MODEL REPRESENTATION IN AUTONOMOUS SYSTEMS AND APPLICATIONS

BACKGROUND

This disclosure relates generally to world models for autonomous vehicles, and more particularly to compression of world model data based on keyframes.

Autonomous and semi-autonomous vehicles, also known as self-driving cars, driverless cars, advanced driver assistance vehicles, or robotic cars, are typically equipped with functionality that enables them to navigate from a source location to a destination location without requiring a human driver to continuously monitor, control, and/or directly operate the vehicle. Automation of driving is difficult due to several reasons. For example, autonomous vehicles use sensors to make driving decisions on the fly, but vehicle sensors cannot observe everything all the time. Vehicle sensors can be obscured or occluded by corners, rolling hills, and other vehicles, glare, objects, or road users (pedestrians, animals, bicyclists, etc.). Input from the vehicle sensors may not be processed early or fast enough for the autonomous planning or control functionality to make appropriate decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use accurate map data to alleviate some of the processing required to determine or corroborate some of the above information in real time, instead of or in addition to strictly relying on sensor data. For instance, autonomous vehicles can use map data to build a world model aligned to the coordinate frame of the autonomous vehicle. For safe navigation of an autonomous vehicle, world model frames are typically computed at a rate of about 30 world model frames per second. The large data size of the world model frames can consume significant communication, processing, and/or storage resources on the autonomous vehicle.

SUMMARY

Embodiments of the present disclosure relate to keyframe-based compression for world model (WM) systems and applications.

In an example embodiment, a method includes computing a current keyframe representative of an area around an autonomous vehicle at a current time based on map data. The method also includes transforming a preceding keyframe to a coordinate frame of the autonomous vehicle at a first time prior to completing computation of the current keyframe to generate a first WM frame. The method also includes transforming the preceding keyframe to the coordinate frame of the autonomous vehicle at a second time after the first time and prior to completing computation of the current keyframe to generate a second WM frame.

In another example embodiment, a method includes computing, at a first frequency, a plurality of keyframes representative of one or more areas around an autonomous vehicle based on map data. The method also includes transforming, with a second frequency that is greater than the first frequency, a most recent keyframe to a coordinate frame of the autonomous vehicle to generate frames such that multiple WM frames are generated from at least one keyframe.

In another example embodiment, a system includes one or more processors to implement first and second WM buffers, a WM producer node, and a WM transformer node. The WM producer node is coupled to each of the first and second WM buffers to compute keyframes representative of one or more areas around an autonomous vehicle with a first frequency based on map data, and to alternately populate the first WM buffer and the second WM buffer with the keyframes. The WM transformer node is coupled to each of the first and second WM buffers to transform over time with a second frequency that is greater than the first frequency a most recent keyframe stored in the first WM buffer or the second WM buffer to a coordinate frame of the autonomous vehicle.

BRIEF DESCRIPTION OF THE DRAWINGS

The present systems and methods for WM keyframe-based compression are described in detail below with reference to the attached drawing figures, wherein:

FIG. 5 illustrates example components of an HD map, in accordance with one or more embodiments of the present disclosure;

FIG. 9A illustrates an example architecture to compute a WM frame, in accordance with one or more embodiments of the present disclosure;

FIG. 9B is a flow diagram showing a method that may be implemented by a lanes collector, segment graph producer, and/or other component(s) of the architecture of FIG. 9A, in accordance with one or more embodiments of the present disclosure;

DETAILED DESCRIPTION

Figure 1:
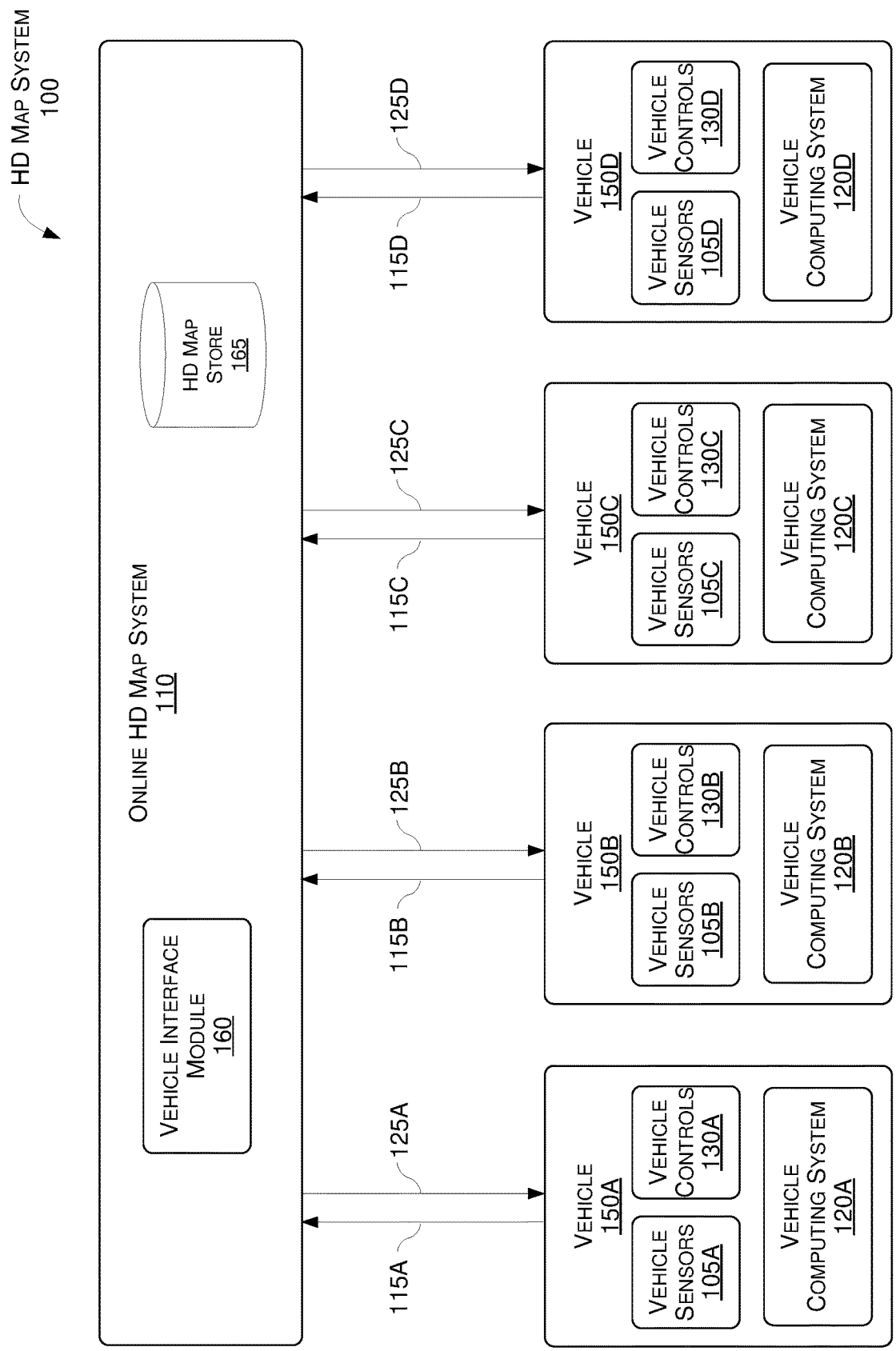
FIG. 1 illustrates an example overall system environment of an HD map system that may interact with multiple vehicles, in accordance with one or more embodiments of the present disclosure.

Systems and methods are disclosed related to processing of map data with large data size in autonomous vehicles. In one or more embodiments, map data may include lanes, traffic signs and lights, wait conditions, and the like, and may be used at an autonomous vehicle to build a world model around the autonomous vehicle. In general, static content of each map-based world model is content that changes relatively slowly, and as such does not need to be generated for every frame. Accordingly, some embodiments separate generation of data for the autonomous vehicle into multiple tasks in which tasks with higher latency are performed less frequently than tasks with lower latency. For example, the generation of data may be divided into a higher latency lower frequency world model keyframe generation task and a lower latency higher frequency transformation task. Alternatively or additionally, the tasks may include a lower latency higher frequency transformation computation task. These tasks may repeat or iterate over time.

In an example embodiment, world model keyframes around an autonomous vehicle are computed over time and with a first frequency based on map data, such as a lane graph. A most recent world model keyframe at any given time is transformed over time and with a second frequency that is greater than the first frequency to a coordinate frame of the autonomous vehicle to generate multiple world model frames such that multiple world model frames are generated from each world model keyframe. In another example embodiment, a current world model keyframe around the autonomous vehicle is computed based on the map data. A preceding world model keyframe may be transformed to a coordinate frame of the autonomous vehicle at a first time prior to completing computation of the current world model keyframe to generate a first world model frame. The preceding world model keyframe may also be transformed to the coordinate frame of the autonomous vehicle at a second time after the first time and prior to completing computation of the current world model keyframe to generate a second world model frame. In both example embodiments, higher latency computation of world model keyframes is performed with less frequency than lower latency generation of world model frames.

Some embodiments may implement a double buffer for the world model keyframes. For example, world model keyframes may alternately be populated in a first world model buffer or a second world model buffer as they are computed. While a current world model keyframe is being computed and populated in the first or second world model buffer, a preceding or most recently computed world model keyframe in the other of the second or first world model buffer is repeatedly transformed to the coordinate frame of the autonomous vehicle to generate world model frames. A compression ratio of some embodiments herein may depend on a speed of the autonomous vehicle. For example, the compression ratio may be at least 10:1 (e.g., 10:1, 12:1, 20:1, or any other ratio in which the first number is at least ten times the second number) when the autonomous vehicle is traveling at about 90 miles per hour (mph) or about 40 meters per second (m/s). Alternatively or additionally, the compression ratio may be at least 40:1 (e.g., 40:1, 45:1, 50:1, or any other ratio in which the first number is at least forty times the second number) when the autonomous vehicle is traveling at about 22 mph or about 10 m/s.

FIG. 1 illustrates an example overall system environment of an HD map system 100 that may interact with multiple vehicles, according to one or more embodiments of the present disclosure. The HD map system 100 may comprise an online HD map system 110 that may interact with two or more vehicles 150 (e.g., vehicles 150A-150D) of the HD map system 100. The vehicles 150 may be autonomous vehicles, semi-autonomous vehicles, or non-autonomous vehicles. An example embodiment of the vehicles 150 is illustrated and described with respect to FIGS. 15A-15D. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

With continued reference to FIG. 1, the online HD map system 110 may be configured to receive sensor data that may be captured by vehicle sensors 105 (e.g., 105A-105D) of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120A-120D) to make requests for information and services. For example, a vehicle computing system 120 may make a request for HD map data for driving along a route and the online HD map system 110 may provide the requested HD map data to the vehicle computing system 120. The vehicle computing system 120 may implement world model keyframe-based compression on the HD map data received from the online HD map system 110.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
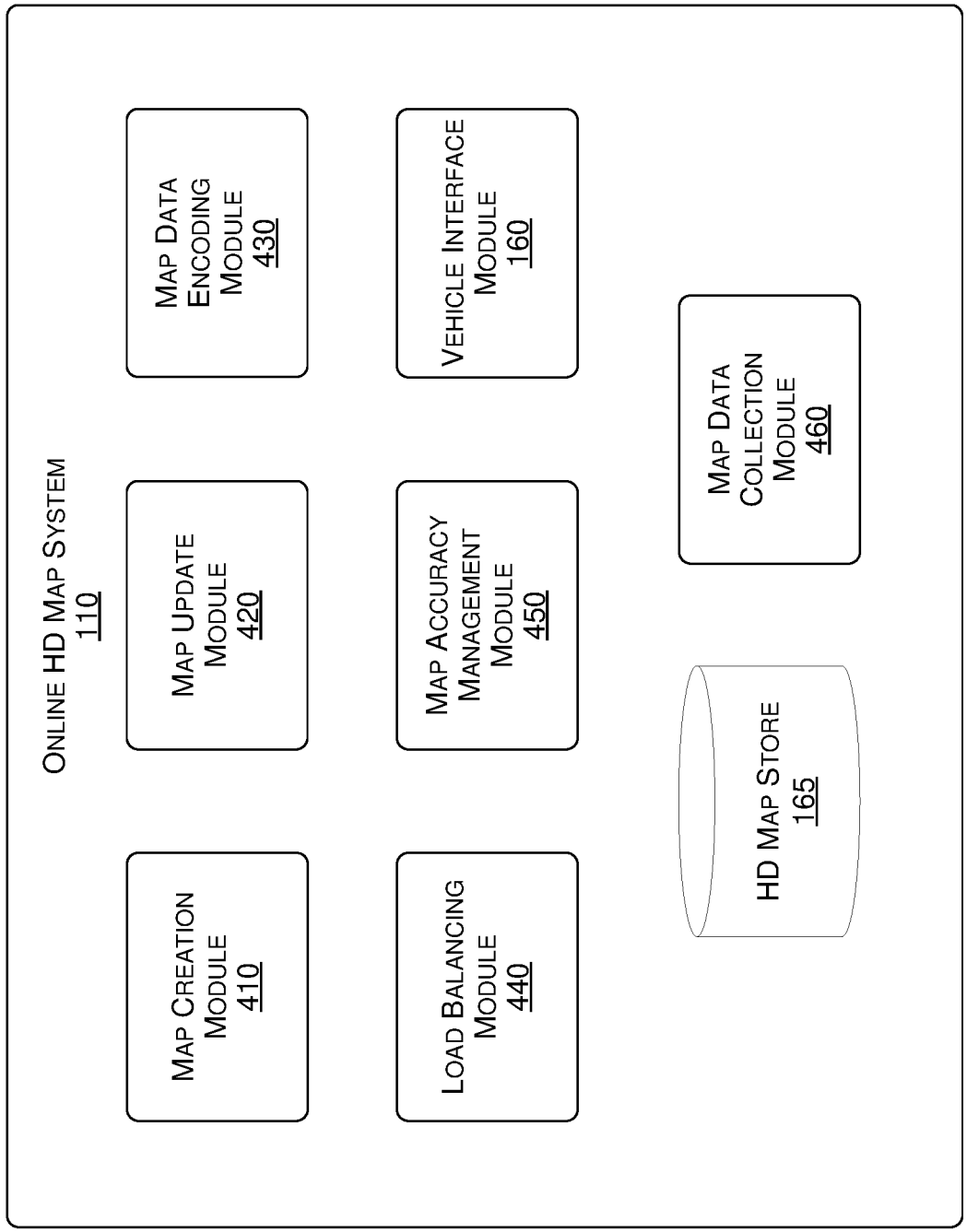
FIG. 4 illustrates an example system architecture of an online HD map system that may be included in the system environment of FIG. 1, in accordance with one or more embodiments of the present disclosure.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of two or more vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165. The foregoing describes one method to generate HD maps. More generally, the HD maps described herein may be generated using the foregoing and/or other suitable method(s).

The online HD map system 110 may be configured to send HD map data 125 to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data 125 of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105A-D), vehicle controls 130 (e.g., vehicle controls 130A-130D), and a vehicle computing system 120 (e.g., vehicle computer systems 120A-120D). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of the links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
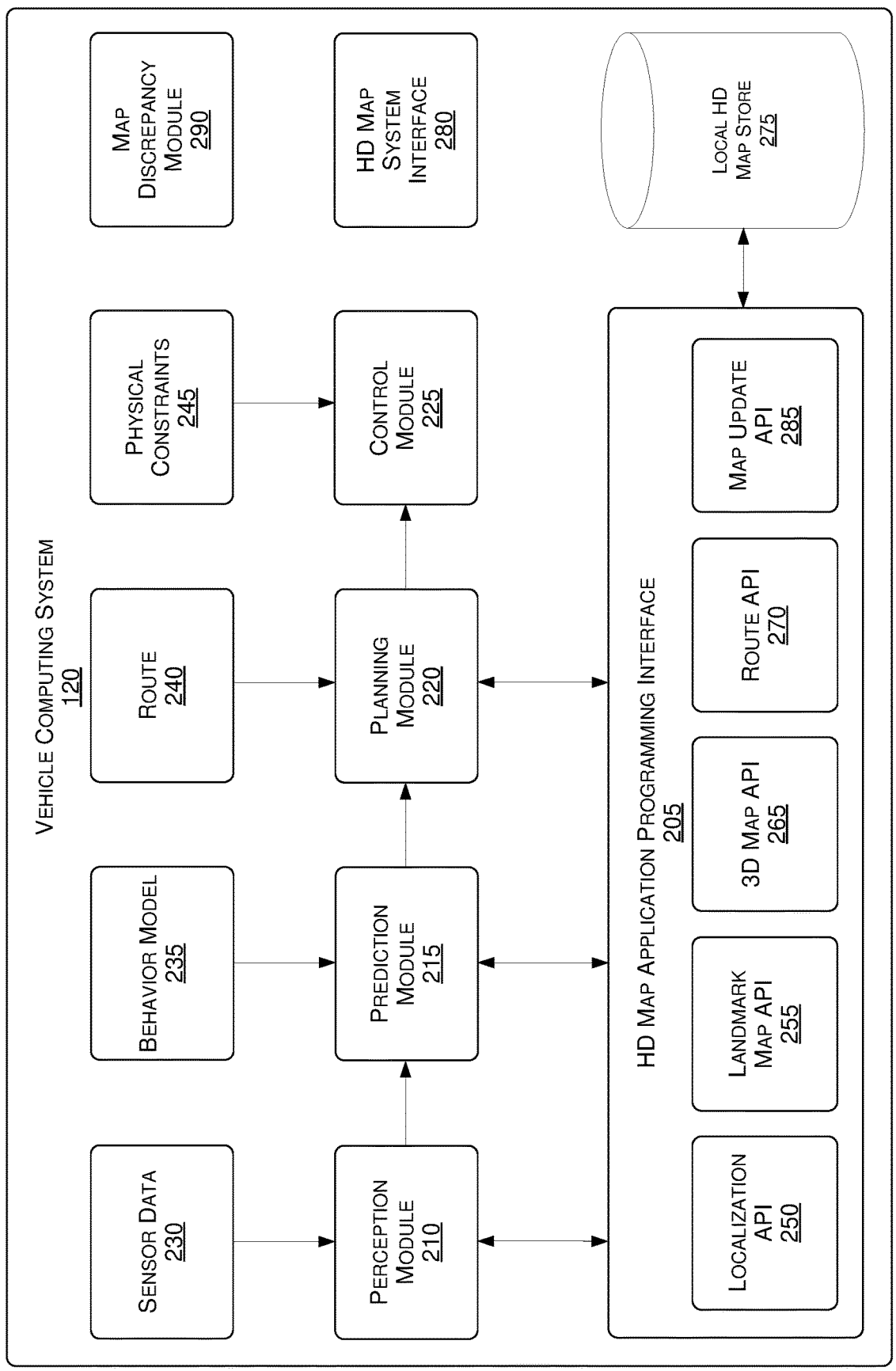
FIG. 2 illustrates an example system architecture of a vehicle computing system that may be included in the system environment of FIG. 1, in accordance with one or more embodiments of the present disclosure.

FIG. 2 illustrates an example system architecture of the vehicle computing system 120, according to one or more embodiments of the present disclosure. The vehicle computing system 120 may include a perception module 210, a prediction module 215, a planning module 220, a control module 225, a local HD map store 275, an HD map system interface 280, a map discrepancy module 290, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models (235) of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 220 may be configured to receive information describing the surroundings of the corresponding vehicle 150 from the prediction module 215 and a route 240 that indicate or determine a destination of the vehicle 150, and that may indicate the path that the vehicle 150 may take to get to the destination.

The planning module 220 may also be configured to use the information from the prediction module 215 and the route 240 to plan a sequence of actions that the vehicle 150 may take within a short time interval, for example, within the next few seconds. In some embodiments, the planning module 220 may be configured to specify a sequence of actions as one or more points representing nearby locations that the vehicle 150 may drive through next. The planning module 220 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 220. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send the control signals to the vehicle controls 130 that may cause the vehicle 150 to execute the specified sequence of actions and may cause the corresponding vehicle 150 to move as planned according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the HD map data using an HD map application programming interface (API) 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD Map system 110. The HD map API 205 may be configured to be capable of processing the map data format as provided by the online HD Map system 110. The HD map API 205 may be configured to provide the vehicle computing system 120 with an interface for interacting with the HD map data. The HD map API 205 may include several APIs including a localization API 250, a landmark map API 255, a route API 270, a 3D map API 265, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD Map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, the vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within specified degrees of accuracy) route specifying lanes based on the HD maps. The localize-route API may be configured to receive as input a route from a source to a destination via one or more third-party maps and may be configured to generate a high precision (e.g., within a specified degree of precision, such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and returns lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map API 265 may include a fetch-navigable-surfaces API and a fetch-occupancy-grid API. The fetch-navigable-surfaces API may be configured to receive, as input, identifiers for one or more lane elements and returns navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to be useful to detect obstacles and to change direction, if necessary.

The 3D map APIs 265 also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 updated based on changes in map data that may be observed by vehicle sensors 105 of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110 or of an HD Map. The route APIs 270 may include an add-planned-routes API and a get-planned-route API. The add-planned-routes API may be configured to provide information describing planned routes to the online HD map system 110 so that information describing relevant HD maps can be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data can be deleted. Accordingly, the add-planned-routes API may be configured to allow the vehicle 150 to indicate the route the vehicle 150 is planning on taking in the near future as an autonomous trip. The add-planned-route API may be configured to align the route to the HD map, record the route and its TTL value, and ensure that the HD map data for the route stored in the vehicle computing system 120 is updated (e.g., up-to-date). The get-planned-routes API may be configured to return a list of planned routes and provide information describing a route identified by a route identifier.

The map update API 285 may be configured to manage operations related to updating the map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

The map discrepancy module 290 can be configured to be operated with the map update API 285 to determine map discrepancies and to communicate map discrepancy information to the online HD map system 110. In some aspects, determining map discrepancies involves comparing sensor data 230 of a particular location to HD map data for that particular location. For example, HD map data may indicate that a lane of a freeway should be usable by the vehicle 150, but sensor data 230 may indicate there is construction work occurring in that lane which has been closed from use, or is otherwise no longer available. Upon detecting a map discrepancy by the map discrepancy module 290, the corresponding vehicle 150 sends an update message to the online HD map system 110 that comprises information regarding the detected map discrepancy. The map discrepancy module 290 may be configured to construct the update message, which may comprise a vehicle identifier (ID), one or more timestamps, a route traveled, lane element IDs of lane elements traversed, a type of discrepancy, a magnitude of discrepancy, a discrepancy fingerprint to help identify duplicate discrepancy alert messages, a size of message, etc. In some embodiments, one or more operations of the map discrepancy module 290 may be at least partially handled by a map data collection module 460 of FIG. 4 as detailed below.

In some embodiments, the corresponding vehicle 150 may be configured to send an update message to the online HD map system 110 or to the local HD map store 275 upon detection of a map discrepancy and/or periodically send update message. For example, the corresponding vehicle 150 may be configured to record discrepancies and report the discrepancies to the online HD map system 110 via an update message once every interval of time (e.g., 30 minutes) or distance traveled (e.g., 10 miles). The online HD map system 110 can be configured to manage the update messages and prioritize the update messages, as described in more detail with reference to map data collection module 460 below.

In some embodiments, the corresponding vehicle 150 can be configured to send update messages to the online HD map system 110 only upon reaching or docking at high bandwidth access points. Once the corresponding vehicle 150 is connected to the Internet (e.g., network), it can be configured to send either a collated update message or a set of update messages. In one or more embodiments, example non-limiting messages can comprise update messages constructed since the last high bandwidth access point was reached or docked at. Use of the high bandwidth access point can be useful for transmitting large amounts of data. In some aspects, upon receiving a confirmation message that the collated update message or one or more update messages were received by the online HD map system 110, the corresponding vehicle 150 marks the data for deletion to schedule a local delete process and/or deletes the data. Alternatively, the corresponding vehicle 150 may report to the online HD map system 110 periodically based on time, such as every hour.

The map discrepancy module 290 can be configured to function and perform operations related to discrepancy identification in response to messages from the online HD map system 110. For example, upon receiving a message requesting data about a particular location along a route of the corresponding vehicle 150, the map discrepancy module 290 can be configured to instruct one or more vehicle sensors 105 of the corresponding vehicle 150 to collect and report that data to the map discrepancy module 290. Upon receipt of the data, the map discrepancy module 290 can be configured to construct a message containing the data and send the message to the online HD map system 110, either immediately, at the next scheduled time of a periodic schedule, or at the next high bandwidth access point, etc.

The map discrepancy module 290 may be configured to determine a degree of urgency of the determined map discrepancy to be included in an update to any HD map that includes the region having the discrepancy. For example, there may be two degrees of urgency, those being low urgency and high urgency. The online HD map system 110 may consider the degree of urgency of an update message when determining how to process the information in the update message, as detailed below with regard to map data collection module 460. For example, a single lane closure on a remote or rural backroad may be determined to have low urgency, whereas total closure of a major highway in a city of one million people may be determined to have high urgency. In some instances, high urgency update messages may be handled by the online HD map system 110 before low urgency update messages.

In some embodiments, the corresponding vehicle 150 can be configured to continually record sensor data 230 and encode relevant portions thereof for generation of messages to the online HD map system 110, such as in response to requests for additional data of specific locations. In an embodiment, the vehicle 150 can be configured to only delete continually recorded sensor data 230 upon confirmation from the online HD map system 110 that none of the sensor data 230 is needed by the online HD map system 110.

Figure 3:
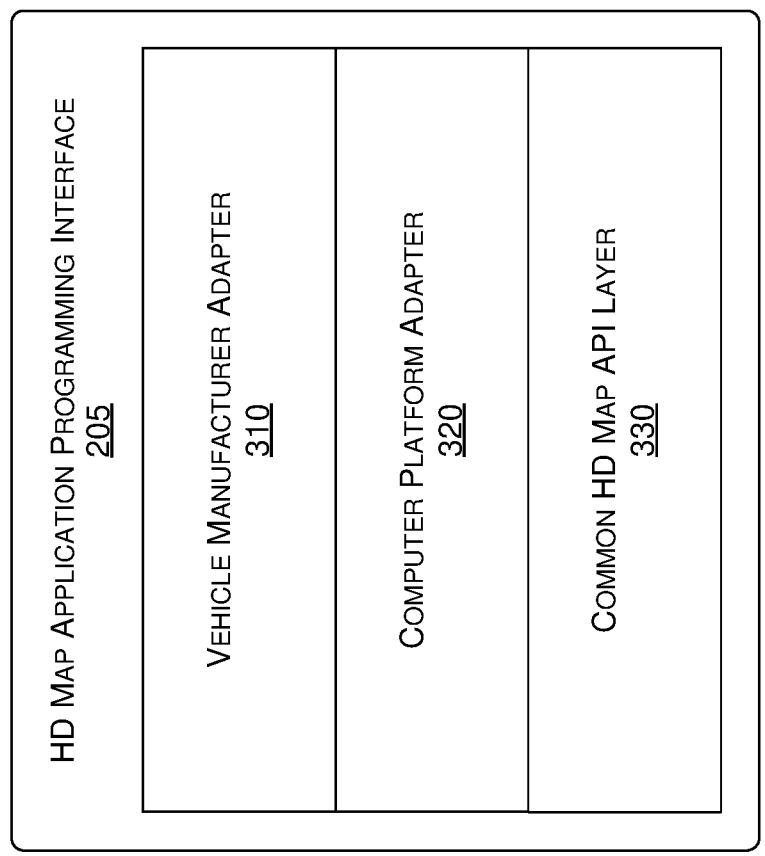
FIG. 3 illustrates an example of various layers of instructions in an HD map API of the vehicle computing system of FIG. 1, in accordance with one or more embodiments of the present disclosure.

FIG. 3 illustrates an example of various layers of instructions in the HD map API 205 of the vehicle computing system 120, according to one or more embodiments of the present disclosure. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided by vendors, such as NVIDIA Corporation, QUALCOMM, and INTEL. These platforms may provide functionality for use by autonomous vehicle manufacturers in manufacture of autonomous vehicles 150. A vehicle manufacturer can use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and allows the vehicle 150 to interact with the online HD map system 110.

As shown in FIG. 3, the HD map API 205 may be implemented as a library that includes a vehicle manufacturer adapter 310, a computer platform adapter 320, and a common HD map API layer 330. The common HD map API layer 330 may be implemented to comprise generic instructions that can be used across two or more vehicle compute platforms and vehicle manufacturers. The computer platform adapter 320 may be implemented to include instructions that may be specific to each computer platform. For example, the common HD map API layer 330 may be implemented to invoke the computer platform adapter 320 to receive data from sensors supported by a specific computer platform. The vehicle manufacturer adapter 310 may be implemented to comprise instructions specific to a vehicle manufacturer. For example, the common HD map API layer 330 may be implemented to invoke functionality provided by the vehicle manufacturer adapter 310 to send specific control instructions to the vehicle controls 130.

The online HD map system 110 may be implemented to store computer platform adapters 320 for two or more computer platforms and vehicle manufacturer adapters 310 for two or more vehicle manufacturers. The online HD map system 110 may be implemented to determine the particular vehicle manufacturer and the particular computer platform for a specific autonomous vehicle 150. The online HD map system 110 may be implemented to select the vehicle manufacturer adapter 310 for the particular vehicle manufacturer and the computer platform adapter 320 the particular computer platform of that specific vehicle 150. In addition, the online HD map system 110 can be implemented to send instructions of the selected vehicle manufacturer adapter 310 and the selected computer platform adapter 320 to the vehicle computing system 120 of that specific autonomous vehicle 150. The vehicle computing system 120 of that specific autonomous vehicle 150 may be implemented to install the received vehicle manufacturer adapter 310 and the compute platform adapter 320. The vehicle computing system 120 can be implemented to periodically check or verify whether the online HD map system 110 has an update to the installed vehicle manufacturer adapter 310 and the compute platform adapter 320. Additionally, if a more recent update is available compared to the version installed on the vehicle 150, the vehicle computing system 120 may be implemented to request and receive the latest update and to install it.

HD Map System Architecture

FIG. 4 illustrates an example system architecture of the online HD map system 110, according to one or more embodiments of the present disclosure. The online HD map system 110 may include a map creation module 410, a map update module 420, a map data encoding module 430, a load balancing module 440, a map accuracy management module 450, a vehicle interface module 160, a map data collection module 460, and an HD map store 165. Some embodiments of online HD map system 110 may include more or fewer modules than shown in FIG. 4. Functionality indicated as being performed by a particular module may be implemented by other modules. In some embodiments, the online HD map system 110 may be implemented as a distributed system comprising two or more processing systems.

The map creation module 410 may be configured to create the HD map data of HD maps from sensor data collected from several vehicles (e.g., 150A-150D) that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed (e.g., uniformly distributed) across different vehicles 150 (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy.

In some embodiments, the map data collection module 460 can be configured to monitor vehicles 150 and process status updates from vehicles 150 to determine whether to request one or more certain vehicles 150 for additional data related to one or more particular locations.

FIG. 5 illustrates example components of an HD map 510, according to one or more embodiments of the present disclosure. The HD map 510 may be configured to include HD map data of maps of several geographical regions. In the present disclosure, reference to a map or an HD map, such as HD map 510, may include reference to the map data that corresponds to such a map. Further, reference to information of a respective map may also include reference to the map data of that map.

In some embodiments, the HD map 510 of a geographical region may comprise a landmark map (LMap) 520 and an occupancy map (OMap) 530. The landmark map 520 may comprise information or representations of driving paths (e.g., lanes, yield lines, safely navigable space, driveways, unpaved roads, etc.), pedestrian paths (e.g., cross walks, sidewalks, etc.), and landmark objects (e.g., road signs, buildings, etc.) For example, the landmark map 520 may comprise information describing lanes including the spatial location of lanes and semantic information about each lane. The spatial location of a lane may comprise the geometric location in latitude, longitude, and elevation at high precision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In some embodiments, the landmark map 520 may comprise information describing stop lines, yield lines, spatial location of crosswalks, safely navigable space, spatial location of speed bumps, curb, road signs comprising spatial location all types of signage that is relevant to driving restrictions, etc. Examples of road signs described in an HD map 510 may include traffic signs, stop signs, traffic lights, speed limits, one-way, do-not-enter, yield (vehicle, pedestrian, animal), etc.

In some embodiments, the information included in a landmark map 520 can be associated with a confidence value measuring a probability of a representation being accurate. A representation of an object is accurate when information describing the object matches attributes of the object (e.g., a driving path, a pedestrian path, a landmark object, etc.). For example, when spatial location and semantic information of a driving path can match attributes (e.g., physical measurements, restrictions, etc.) of the driving path, the representation of the driving path can be considered to be accurate. The vehicle computing system 120 (e.g., the planning module 220) may use the confidence value to control the vehicle 150. For example, if a representation of a landmark object is associated with a high confidence value in the landmark map 520 but the vehicle 150 does not detect the landmark object based on the vehicle sensors 105 and the corresponding observation of the environment around the vehicle 150, the vehicle computing system 120 can be configured to control the vehicle 150 to avoid the landmark object that is presumed to be present based on the high confidence value, or control the vehicle 150 to follow driving restrictions imposed by the landmark object (e.g., causes the vehicle 150 to yield based on a yield sign on the landmark map).

In some embodiments, the occupancy map 530 may comprise a spatial 3D representation of the road and physical objects around the road. The occupancy map 530 may also be referred to herein as an occupancy grid. Similarly, the data stored in an occupancy map 530 may also be referred to herein as occupancy grid data. The 3D representation of the road and physical objects around the road may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 may be configured to use data compression techniques to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 may not use or rely on data that may typically be included in maps, such as addresses, road names, ability to geo-code an address, and ability to compute routes between place names or addresses. The vehicle computing system 120 or the online HD map system 110 may access other map systems, for example (and without limitation), Open Street Maps, to obtain this information. Accordingly, a vehicle computing system 120 or the online HD map system 110 may receive map information from a tool such as Open Street Maps and may convert the information to a route based on the HD map 510 or may convert the information such that it may be compatible for us on the HD map 510.

Geographical Regions in Hd Maps

The online HD map system 110 can be configured to divide a large physical area into geographical regions and to store a representation of each geographical region. Each geographical region may represent a contiguous area bounded by a geometric shape—for example (and without limitation), a rectangle or square. In some embodiments, the online HD map system 110 may be configured to divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing a sparsely populated area with very few streets. In some embodiments, the online HD map system 110 can be configured to determine the size of a geographical region based on an estimate of an amount of information that may be used to store the various elements of the physical area relevant for an HD map 510.

In an embodiment, the online HD map system 110 may represent a geographic region using an object or a data record that may comprise various attributes including (without limitation): a unique identifier for the geographical region; a unique name for the geographical region; a description of the boundary of the geographical region, for example, using a bounding box corresponding to sets of latitude and longitude coordinates; and a collection of landmark features and occupancy grid data.

Figure 6A:
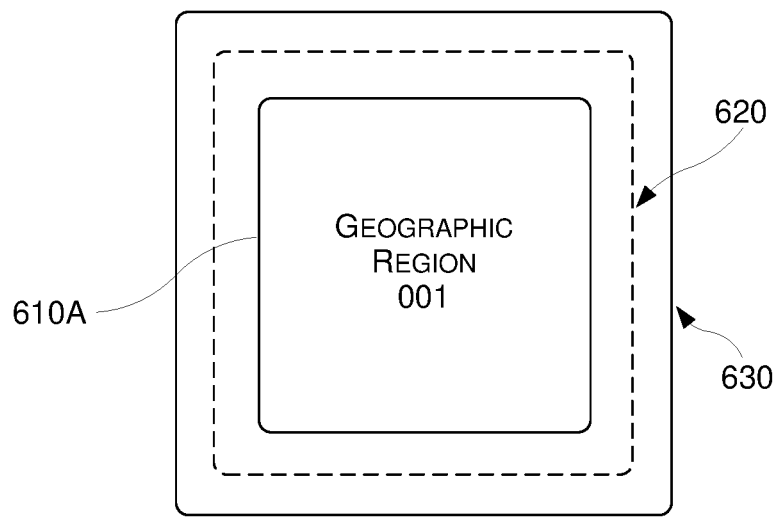
FIGS. 6A-6B illustrate example geographical regions that can be defined in an HD map, in accordance with one or more embodiments of the present disclosure.
Figure 6B:
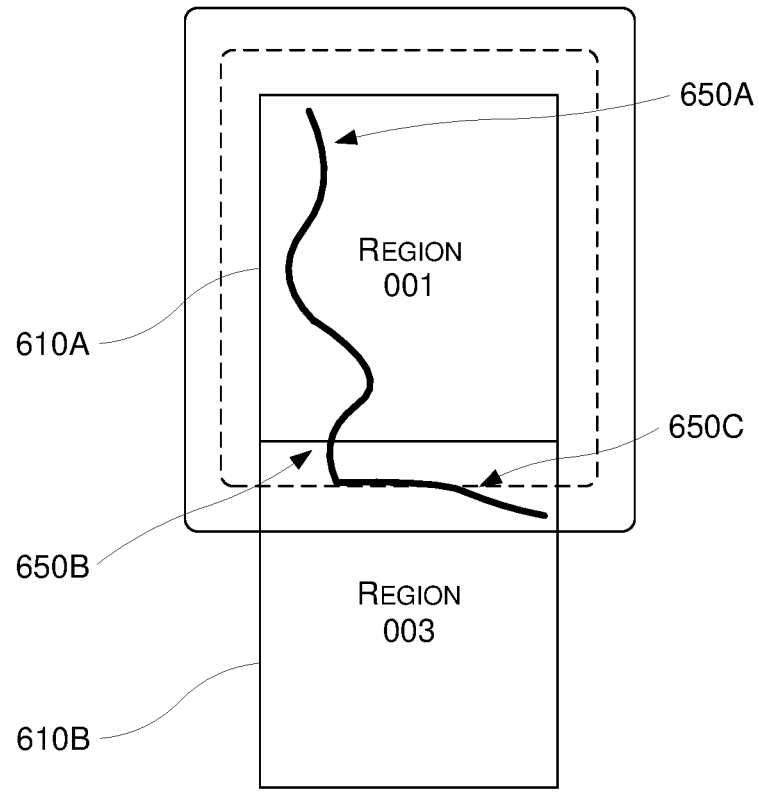

FIGS. 6A-6B illustrate example geographical regions 610A and 610B that can be defined in an HD map, according to one or more embodiments of the present disclosure. FIG. 6A illustrates a square geographical region 610A. FIG. 6B illustrates two neighboring geographical regions 610A and 610B. The online HD map system 110 can be configured to store data in a representation of a geographical region that can allow for a smooth transition from one geographical region to another as a vehicle 150 drives across geographical region boundaries.

In some embodiments, as illustrated in FIGS. 6A-6B, each geographic region may include a buffer of a predetermined width (area) around it. The buffer may comprise redundant map data around one or more or all sides of a geographic region (e.g., in the case that the geographic region is bounded by a rectangle). Therefore, in some embodiments, where the geographic region may be a certain shape, the geographic region may be bounded by a buffer that may be a larger version of that shape. By way of example, FIG. 6A illustrates a boundary 620 for a buffer of approximately 50 meters around the geographic region 610A and a boundary 630 for a buffer of 100 meters around the geographic region 610A.

In some embodiments, the vehicle computing system 120 can be configured to switch the current geographical region of a corresponding vehicle 150 from one geographical region to a neighboring geographical region when the corresponding vehicle 150 crosses a predetermined (e.g., defined) threshold distance within the buffer. For example, as shown in FIG. 6B, the corresponding vehicle 150 starts at location 650A in the geographical region 610A. The corresponding vehicle 150 may traverse along a route to reach a location 650B where it may cross the boundary of the geographical region 610 but may stay within the boundary 620 of the buffer. Accordingly, the vehicle computing system 120 of the corresponding vehicle 150 may continue to use the geographical region 610A as the current geographical region of the vehicle 150. Once the corresponding vehicle 150 crosses the boundary 620 of the buffer at location 650C, the vehicle computing system 120 may be configured to switch the current geographical region of the corresponding vehicle 150 to geographical region 610B from geographical region 610A. The use of a buffer may reduce or prevent rapid switching of the current geographical region of a vehicle 150 as a result of the vehicle 150 travelling along a route that may closely track a boundary of a geographical region.

Lane Representations in Hd Maps

The HD map system 100 may represent lane information of streets in HD maps. Although the embodiments described may refer to streets, the techniques may be applicable to any highways, alleys, avenues, boulevards, paths, etc., on which vehicles can travel. The HD map system 100 can use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 can store information relative to lanes, for example, landmark features such as road signs and traffic lights relative to the lanes, occupancy grids relative to the lanes for obstacle detection, and navigable spaces relative to the lanes so the vehicle 150 can plan/react in emergencies when the vehicle 150 makes an unplanned move out of the lane. Accordingly, the HD map system 100 can store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and any and all relevant features/data relative to the lane and adjoining and connected lanes.

Figure 7:
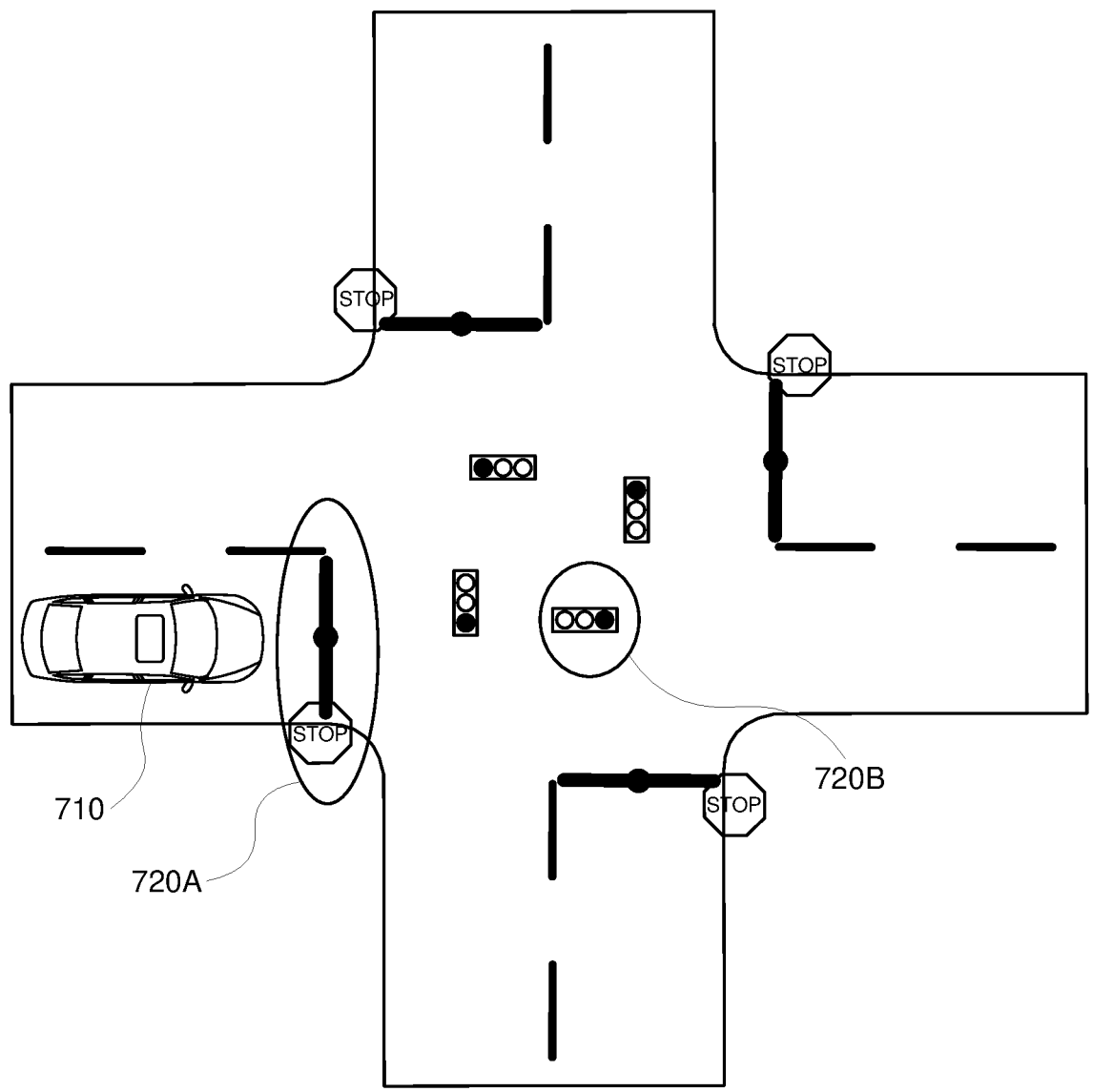
FIG. 7 illustrates example lane representations in an HD map, in accordance with one or more embodiments of the present disclosure.

FIG. 7 illustrates example lane representations in an HD map, according to one or more embodiments of the present disclosure. FIG. 7 illustrates a vehicle 710 at a traffic intersection. The HD map system 100 provides the vehicle 710 with access to the map data that may be relevant for autonomous driving of the vehicle 710. This may include, for example, features 720A and 720B that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map system 100 can provide an HD map that represents portions of the lanes as lane elements. The lane elements can specify the boundaries of the lane and various constraints including the legal direction in which a vehicle 710 can travel within the lane element, the speed with which the vehicle can drive within the lane element, whether the lane element can be for left turn only, or right turn only, etc. In some embodiments, the HD map system 100 can provide a map that represents a lane element as a continuous geometric portion of a single vehicle lane. The HD map system 100 can store objects or data structures that may represent lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and etc.

Examples of lane elements represented by a HD map of the HD map system 100 can include, for example and without limitation: a piece of a right lane on a freeway, a piece of a lane on a road, a left turn lane, the turn from a left turn lane into another lane, a merge lane from an on-ramp, an exit lane on an off-ramp, and a driveway. The HD map system 100 can comprise an HD map that represents a one-lane road using two lane elements, one for each direction. The HD map system 100 can represent median turn lanes that are shared similar to a one-lane road.

Figure 8A:
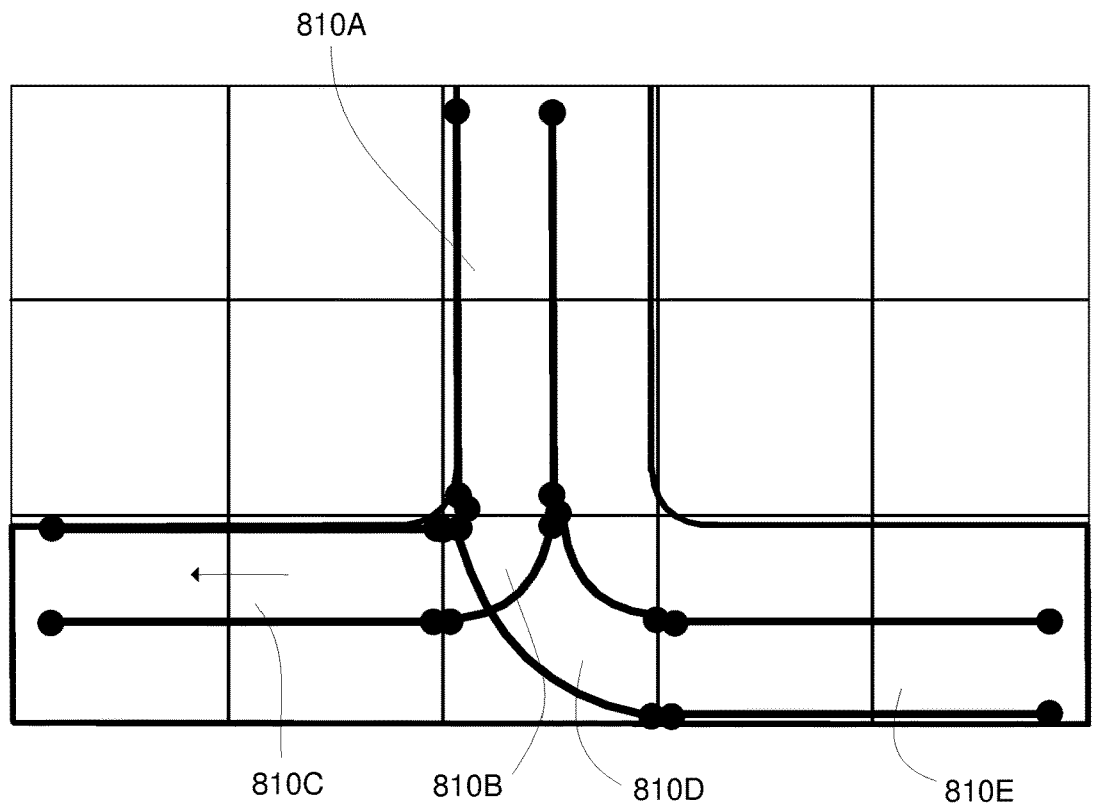
FIGS. 8A and 8B illustrate example lane elements and relations between lane elements in an HD map, in accordance with one or more embodiments of the present disclosure.
Figure 8B:
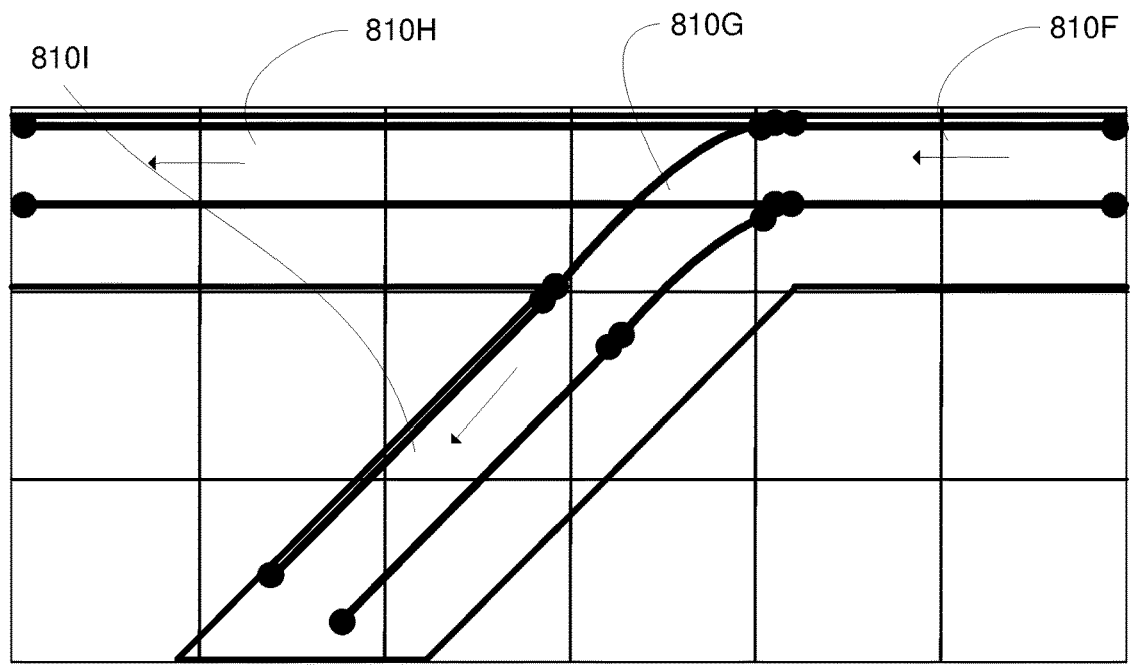

FIGS. 8A and 8B illustrate example lane elements (e.g., LaneEl) and relations between lane elements in an HD map, according to one or more embodiments of the present disclosure. Each of the lane elements of FIGS. 8A and 8B may include, be included in, or correspond to one or more MapsLanes described elsewhere herein. FIG. 8A illustrates an example of a T-junction in a road illustrating a lane element 810A (e.g., an example of straight LaneEl) that may be connected to lane element 810C (e.g., another straight LaneEl) via a turn lane 810B (e.g., a curved LaneEl) and is connected to lane 810E (e.g., another straight LaneEl) via a turn lane 810D (e.g., another curved LaneEl). FIG. 8B illustrates an example of a Y-junction in a road with lane 810F connected to lane 810H directly and connected to lane 810I via lane 810G. The HD map system 100 can determine a route from a source location to a destination location as a sequence of connected lane elements that can be traversed to reach from the source location to the destination location.

An example architecture and method to build a LocalMap around an autonomous vehicle will now be described. In the following discussion: MapsLane refers to a lane defined by a polyline with lane attributes, LaneSegment refers to a mutually exclusive segment stitched from MapsLanes, RoadSegment refers to an atomic element of the core layer of an HD map, LocalLayout refers to a section of an HD map in which relative transformations of all RoadSegments are computed in reference to a root RoadSegment, LaneGraph refers to an exhaustive list of all combinations of paths in the LocalLayout, LaneGraph Lane refers to a drivable path in the LocalLayout, and LaneInfo refers to MapsLanes intermediate metadata used for LaneGraph computation. The foregoing and other specific terms herein may be generalized to refer to a corresponding generic structure, concept, or the like. For example, a "lane graph" may refer to an exhaustive list of all combinations of paths in a section of an HD map in which relative transformations of all atomic elements of the core layer of the HD map are computed in reference to a root atomic element, whether or not the section of the HD map is referred to as a LocalLayout and whether or not the atomic elements are referred to as RoadSegments.

A LocalMap may provide a local view of the HD map, which may be achieved by computing an exhaustive LaneGraph with all the combinations of paths in the LocalLayout. In the process of computing the LaneGraph, other HD map features in the LocalLayout may be produced, such as WaitGroups, TSLObjects, or the like.

In one or more embodiments, WaitGroups may include a collection or grouping of individual wait elements. In at least one embodiment, a wait element constitutes a singular or atomic representation of how wait conditions (potential yielding scenarios) are represented. Each wait element consists of an ego-contender pair (e.g., consisting of the ego-vehicle and at least one contending obstacle or object in the environment) and a wait state that describes the current right of way of the wait element. A wait group ("WaitGroup") associates multiple wait elements together. In one or more embodiments, wait elements are grouped together for wait conditions that are meant to be cleared together. For example, taking an unprotected left may be indicated as having a requirement to yield to pedestrians on the pedestrian crossing at the end of the turn. The grouping of these two wait elements makes it clearer that the ego-vehicle should wait to enter the ego lane of any of the wait elements until both wait elements can be cleared.

A TSL (Traffic sign light) object encodes 3D geometry of traffic light/sign. In one or more embodiments, wait rules can be used to define associations between wait states and light classes, which are used to resolve a current wait state applicable to the wait element, for example a typical wait rule for wait element may look like 'take-way' on green, 'stop-at-entry' on red and 'take-way-translate' on yellow. In one or more embodiments, TSL objects and wait rules may be implemented using internal metadata, and used to when processing a resolution of wait states corresponding to wait elements.

Each lane in the LaneGraph may be aware of its other related lanes (Merges, Splits, Crossing Lanes), changing lanes (left, right lane) and other Map features (WaitGroups, TSL Objects etc.). The LaneGraph and the HD map features may be in the coordinate system of the autonomous vehicle, which may alternatively or additionally be referred to as the rig coordinate system or Ego coordinate system. World model definitions may be used as output of the LocalMap to express these data.

World Model Computation

FIG. 9A illustrates an example architecture 900 to compute a world model (WM) frame, according to one or more embodiments of the present disclosure. As illustrated, the architecture 900 may include a lanes collector 902, a segment graph producer 904, a lane graph producer 906, and a WM generator 908. In general, the lanes collector 902 may collect and maintain MapsLanes in the LocalLayout, the segment graph producer 904 may stitch MapsLanes to mutually exclusive LaneSegments and produce a coarse map (or SegmentGraph), the lane graph producer 906 may compose all combinations of lanes from the LaneSegments where each lane may have its own unique tracking identifier (ID) that may be consistent across frames, and the WM generator 908 may populate WM structures, e.g., WM keyframes, for Lanes, wait conditions, or the like and may transform the computed LaneGraph to the Ego coordinate system and may determine ego-lanes. Output of the WM generator 908 may be referred to as WM frames. Each of the lanes collector 902, the segment graph producer 904, the lane graph producer 906, and the WM generator 908 is discussed in more detail below.

The lanes collector 902 may abstract the collection of lanes from the LocalLayout. Each lane in the LocalLayout may be stored in a wrapper structure. The wrapper structure for each lane in the LocalLayout is referred to as LocalLayoutLane in an example embodiment.

The lanes collector 902 may have a LaneBuffer which it populates for a current LocalLayout build.

The lanes collector 902 may collect lanes by iterating all road segments in the current LocalLayout build.

The LocalLayout for a LaneGraph computation may be built for a predefined radius around a sensor suite (also referred to as a "rig") of sensors typically arranged along a perimeter of an autonomous vehicle. The predefined radius around the rig may define a circular area with the rig at the center of the circular area. The circular area may be referred to as the LocalLayout and/or the boundary or perimeter of the circular area may be referred to as a horizon of the autonomous vehicle or rig.

The segment graph producer 904 may build a coarse map made of LocalMapSegments. MapsLanes in the LocalLayout may be stitched into mutually exclusive LocalMapSegments in which at any given time a MapsLane will be associated with only one LocalMapSegment. A LocalMapSegment may be aware of its other related LocalMapSegments (incoming, outgoing, crossing, and change lane segments). LocalMapSegment may be the atomic unit of the coarse map, also referred to herein as a SegmentGraph.

A MapsLane participating in a LocalMapSegment may be encoded in the MapsLane structure. The MapsLane structure may include an ID of a participating MapsLane and/or an offset of the MapsLane in the LocalMapSegment (this information may be used to deduce Lane Change and other lane assignment attributes). A MapsLane may have left and/or right lane change and/or other information which may be stored in a MapLaneChange structure. The MapLaneChange structure may be used to compute a SegmentChange structure.

Connection information may be encoded in a SegmentConnection structure.

Lane change information may be encoded in the SegmentChange structure.

Crossing segments may be encoded in a SegmentContentions structure.

Wait condition information may be stored in a SegmentWaitCondtion structure.

FIG. 9B is a flow diagram showing a method 910 that may be implemented by the lanes collector 902, the segment graph producer 904, and/or other component(s) of the architecture 900 of FIG. 9A, in accordance with some embodiments of the present disclosure. Each block of the method 910 and/or other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In some implementations, the method 910 and/or other methods described herein are stored on and/or carried out by a vehicle computing system, such as the vehicle computing system 120 described elsewhere herein.

In general, the method 910 may involve the segment graph producer 904 consuming MapsLanes and/or LocalLayoutLanes collected by the lanes collector 902 and stitching them into a list of unique LocalMapSegments to produce the coarse map or SegmentGraph.

In more detail, the method 910, at block 912, includes selecting a seed lane. In an example implementation, the seed lane is selected by analyzing lanes (e.g., MapsLanes, LocalLayoutLanes) within the horizon of the rig until a lane is identified that does not include any incoming lanes and then selecting the identified lane as the seed lane. More generally, the seed lane may be selected at block 912 according to any suitable criteria.

The method 910, at block 914, includes collecting connected lanes in a backward direction. In an example implementation, block 914 includes collecting lanes within the rig's horizon that are transitively connected to the seed lane in the backward direction until a stop condition is reached.

The method 910, at block 916, includes collecting connected lanes in a forward direction. In an example implementation, block 916 includes collecting lanes within the rig's horizon that are transitively connected to the seed lane in the forward direction until a stop condition is reached. The stop condition at block 916 may be the same as or different from the stop condition at block 914. Alternatively or additionally, the stop condition for lane collection in the backward and/or forward directions may include one or more of the following:

A MapsLane and/or LocalLayoutLane participates in a Junction Path. A Junction Path may include a junction of one MapsLane or LocalLayoutLane with another MapsLane or LocalLayoutLane (such as an ego-lane and a connecting merge lane). Each MapsLane and/or LocalLayoutLane that participates in a Junction Path belongs to a corresponding LaneSegment generated for the associated Junction Path.

A MapsLane and/or LocalLayoutLane connection has more than one connecting lane.

A connecting MapsLane and/or LocalLayoutLane driving direction is bidirectional.

A maps connecting lane is not in the current LocalLayout (e.g., is outside the rig's horizon).

The method 910, at block 918, includes stitching the selected and collected MapsLanes and/or LocalLayoutLanes (e.g., the seed lane selected at block 912 and the lanes collected at blocks 914 and 916) into LaneSegments. In an example implementation, the MapsLanes and/or LocalLayoutLanes are stitched according to the following precedents:

MapsLanes and/or LocalLayoutLanes participating in Junction Paths are stitched into LaneSegments and metadata like contender segments, wait elements, and traffic rules are recorded.

Paths in LocalLayout which have a MapsLane and/or LocalLayoutLane with zero incoming/outgoing MapsLanes and/or LocalLayoutLanes are stitched into their respective LaneSegments.

Any unprocessed MapsLanes and/or LocalLayoutLanes left in the Lane Buffer are stitched into their respective LaneSegments.

After the MapsLanes and/or LocalLayoutLanes are stitched into LaneSegments at block 918, metadata like segment relation information, segment change information, or the like may be collected in some implementations.

In at least one example, the segment graph producer 904 may implement or facilitate implementation of one or more of the following functions. An updateSegmentGraph function may consume a valid LocalLayout build, which may in turn be fed to the lanes collector 902 to collect LocalLayoutLanes, which may be used to build a SegmentGraph. In some embodiments, the updateSegmentGraph function is implemented in a public API of the segment graph producer 904. A computeSegmentGraph function may consume a LaneBuffer populated by the lane collector 902 and build a SegmentGraph. The computeSegmentGraph function may be a private function of the segment graph producer 904 and/or may be called from the updateSegmentGraph function. A computeSegment function may compute a new unique segment in the current LocalLayout; the input LocalLayoutLane may be used as a seed lane and may be extended in both backward and forward directions until a stop condition is reached as described elsewhere herein. The computeSegment function may be a private function of the segment graph producer 904 and/or may be called from the computeSegmentGraph function. A collectSegmentLanes function may collect MapLanes for a segment in a given direction (defined by StitchDirection) with associated data stored in a MapsLane structure; MapsLanes for the segment are collected from a pool of MapsLanes in the LaneBuffer (e.g., output of the lanes collector 902). For a given segment the collectSegmentLanes function may be called twice from the computeSegment function to stretch the segment in both backward and forward directions. An updateSegmentGraphInfo function may be called from the updateSegmentGraph function after computing a SegmentGraph. The updateSegmentGraphInfo function may help collect metadata by iterating over all segments in the SegmentGraph. A getSegmentConnections function may gather segment connections of a SegmentGraph. The getSegmentConnections function may be private and/or may be called from the updateSegmentGraphInfo function. A getSegmentChanges function may gather all segment changes of a SegmentGraph. The getSegmentChanges function may be private and/or may be called from the updateSegmentGraphInfo function.

The lane graph producer 906 may compose an exhaustive LaneGraph by performing a depth-first search on the LocalMapSegment Graph. In some implementations, an updateLaneGraph function may be implemented in a public API of the lane graph producer 906. The updateLaneGraph function may update the SegmentGraph with a new Local-Layout build by invoking the updateSegmentGraph function and computing exploded LaneGraph Lanes by doing a depth-first search on a new SegmentGraph. Accordingly, the lane graph producer 906 may generate a LaneGraph that includes exploded LaneGraph Lanes and associated metadata, each exploded LaneGraph Lane having a unique, stable ID to track LaneGraph Lanes between frames. The exploded LaneGraph may be used to produce an output structure like a WM frame, e.g., by the WM generator 908. An ego-lane hint may be determined based on a position of the rig in the LaneGraph geometry. The IDs of the LaneGraph Lanes may be used together with position query to track a stable ego-lane.

The ID of an exploded lane may be computed based on the participating MapsLane. An ID manager may be used to compute unique IDs of the LaneGraph Lanes. The ID manager may maintain a hash table (or hash map) with a list of MapsLane IDs as keys and LaneGraph Lane IDs as corresponding values. Thus, IDs of MapsLanes participating in an exploded lane may be used as keys to maintain consistent LaneGraph Lane IDs between frames.

In some embodiments, the WM keyframe imposes a constraint of triplet points on LaneChunks such that for a point on a lane center of a LaneChunk, there is a corresponding left and right divider point. However, this is not a constraint on the HD map. For a stitched lane channel in the WM keyframe, the triplets may be produced by projecting points onto each polyline from the other two and 3-way merging them; this may happen in a loop for all three polylines in the lane channel.

Figure 9C:
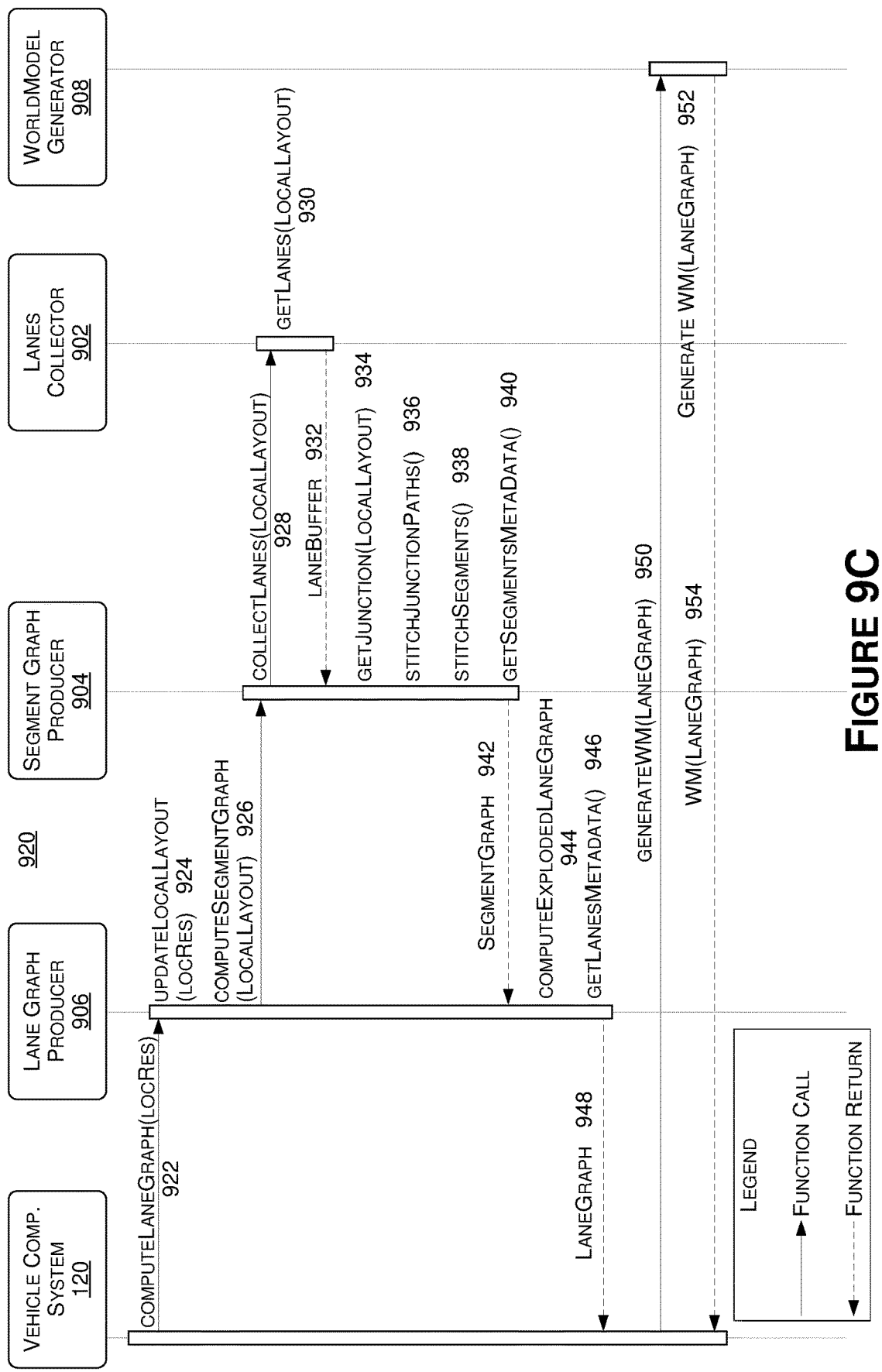
FIG. 9C illustrates a method for generating a WM frame, in accordance with one or more embodiments of the present disclosure.

Consistent with the foregoing, FIG. 9C illustrates a method 920 for generating a WM frame, in accordance with some embodiments of the present disclosure. At 922, the vehicle computing system 120 requests a LaneGraph from the lane graph producer 906. At 924, the lane graph producer updates the LocalLayout. At 926, the lane graph producer requests a SegmentGraph from the segment graph producer 904. At 928, the segment graph producer 904 requests lanes in the LocalLayout from the lanes collector 902. At 930, the lanes collector 902 collects the lanes in the LocalLayout and populates them in a LaneBuffer 932. At 934, the segment graph producer 904 gets junction information from the LocalLayout. At 936, the segment graph producer 904 stitches junction paths. At 938, the segment graph producer 904 stitches collected lanes to mutually exclusive LaneSegments. At 940, the segment graph producer 904 gets metadata of the LaneSegments. At 942, the segment graph producer 904 returns a SegmentGraph (and associated metadata) to the lane graph producer 906. At 944, the lane graph producer computes an exploded LaneGraph. At 946, the lane graph producer 906 gets metadata of LaneGraph Lanes in the LaneGraph. At 948, the lane graph producer 906 returns the LaneGraph (and associated metadata) to the vehicle computing system 120. At 950, the vehicle computing system requests a WM frame from the WM generator 908. At 952, the WM generator 908 generates the WM frame. At 954, the WM generator 908 returns the WM frame to the vehicle computing system 120.

Figure 10:
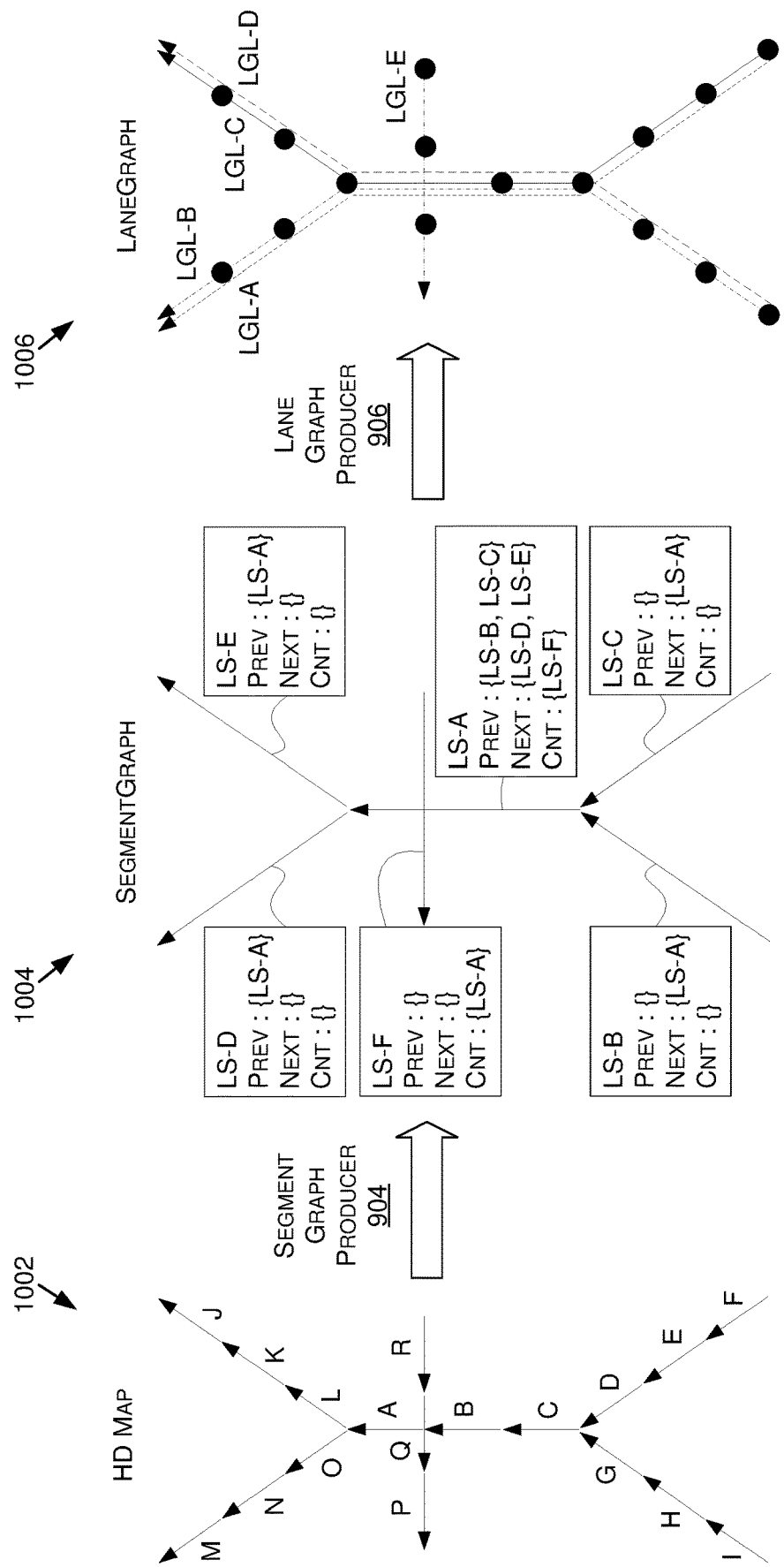
FIG. 10 illustrates an example LaneGraph computation from a simple HD map, in accordance with one or more embodiments of the present disclosure.

FIG. 10 illustrates an example LaneGraph computation from a simple HD map 1002, in accordance with some embodiments of the present disclosure. The HD map 1002 includes RoadSegments with MapsLanes A to R. The lanes collector 902 collects MapsLanes in the LocalLayout. In this example, it is assumed that each of MapsLanes A to R is within the LocalLayout and is collected by the lanes collector 902.

The segment graph producer 904 may then stitch the MapsLanes A to R to mutually exclusive LaneSegments LS-A to LS-F and produce a SegmentGraph 1004. For example, MapsLanes A, B, and C may be stitched to LaneSegment LS-A, MapsLanes G, H, and I may be stitched to LaneSegment LS-B, and so on. The SegmentGraph 1004 and/or associated metadata may identify, for each LaneSegment, one or more of a previous LaneSegment, a next LaneSegment, and a contender LaneSegment.

Finally, the lane graph producer 906 may compose all combinations of lanes from the LaneSegments LS-A to LS-F to generate a LaneGraph 1006 that includes all path combinations of the LaneSegments as LaneGraph Lanes LGL-A to LGL-E. A first LaneGraph Lane LGL-A that includes LaneSegments LS-C, LS-A, and LS-D is represented in FIG. 10 as a short dash line. A second LaneGraph Lane LGL-B that includes LaneSegments LS-B, LS-A, and LS-D is represented in FIG. 10 as a dash-dot line. A third LaneGraph Lane LGL-C that includes LaneSegments LS-C, LS-A, and LS-E is represented in FIG. 10 as a solid line. A fourth LaneGraph Lane LGL-D that includes LaneSegments LS-B, LS-A, and LS-E is represented in FIG. 10 as a long dash line. A fifth LaneGraph Lane LGL-E that includes LaneSegment LS-F is represented in FIG. 10 as a dash-dot-dot line. In FIG. 10 and other FIGS. of LaneGraphs with overlapping portions, overlapping portions of the LaneGraph Lanes have been spatially offset from one another to be visually perceptible. In practice, overlapping portions of LaneGraph Lanes in LaneGraphs may not be spatially separated.

Figure 11A:
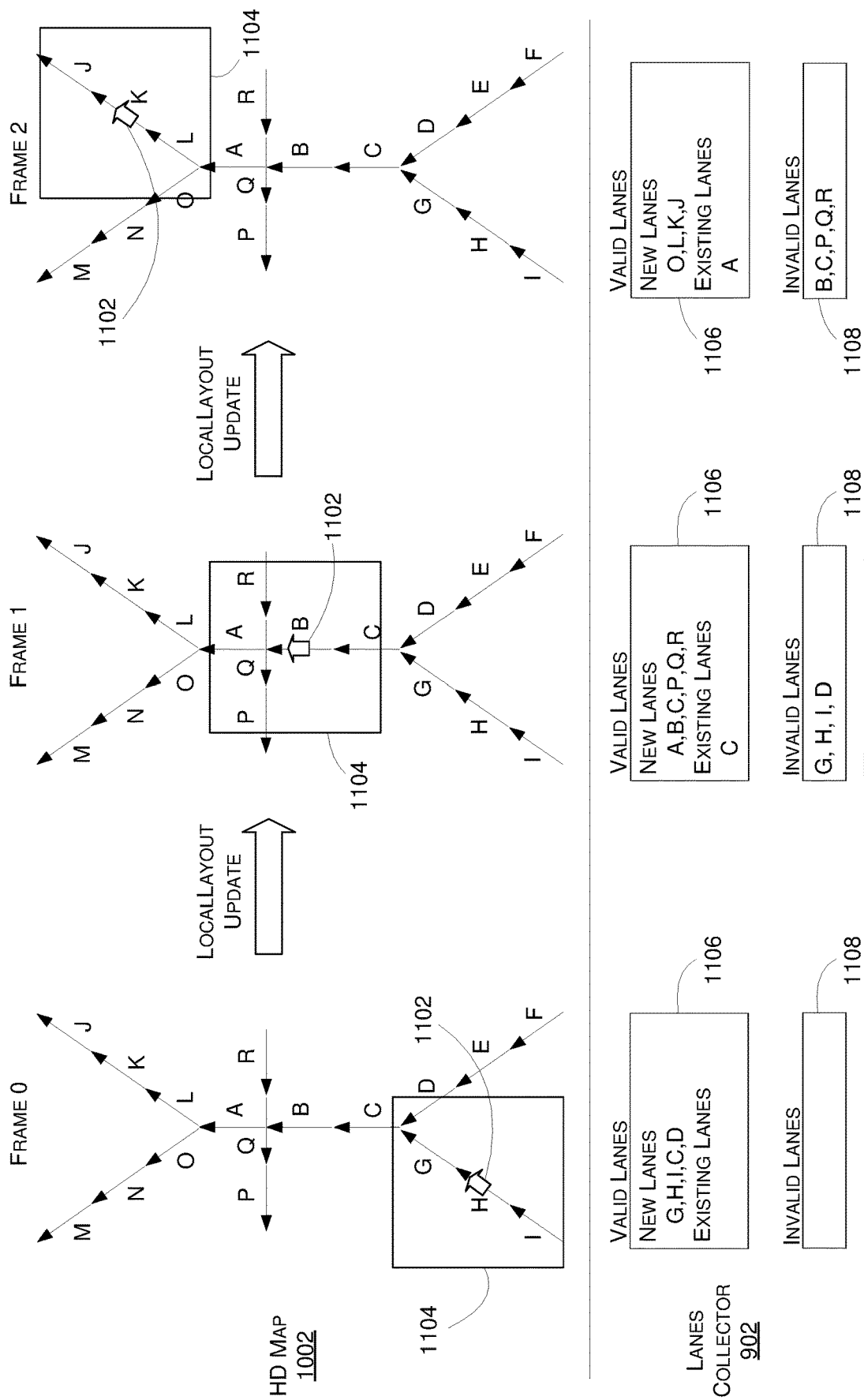
FIGS. 11A and 11B illustrate example LaneGraph computations from the HD map of FIG. 10 for a moving autonomous vehicle or rig, in accordance with one or more embodiments of the present disclosure.
Figure 11B:
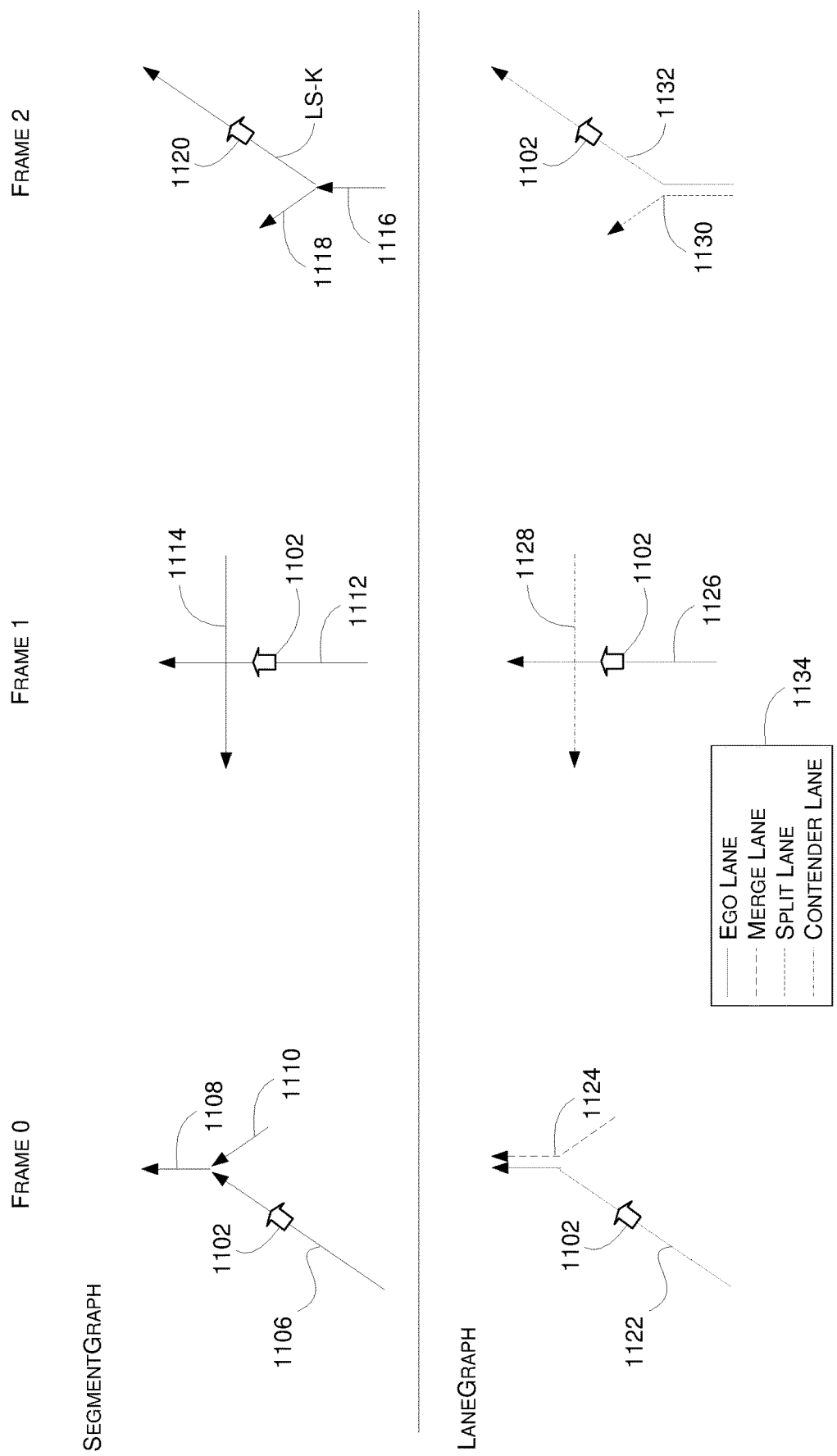

FIGS. 11A and 11B illustrate example LaneGraph computations from the HD map 1002 of FIG. 10 for a moving autonomous vehicle or rig 1102, in accordance with some embodiments of the present disclosure. The illustrated LaneGraph computations are performed at three different times, or frames, labeled Frame 0, Frame 1, and Frame 2, when the rig 1102 is at three different positions indicated in FIG. 11A on the HD map 1002. At Frame 0, the rig 1102 is located on the MapsLane H driving in the direction from MapsLane I to MapsLane G. At Frame 1, the rig 1102 is located on the MapsLane B driving in the direction from MapsLane C to MapsLane A. At Frame 2, the rig 1102 is located on the MapsLane K driving in the direction from MapsLane I to MapsLane G.

As illustrated, the rig 1102 has a LocalLayout 1104 which is updated as the rig 1102 travels. At Frame 0, the LocalLayout 1104 includes MapsLanes G, H, I, C, and D. At Frame 1, the LocalLayout 1104 includes MapsLanes A, B, C, P, Q, and R. At Frame 2, the LocalLayout 1104 includes MapsLanes A, 0, J, K, and L.

At each frame, the lanes collector 902 collects all MapsLanes in the LocalLayout 1104. In some implementations, and as illustrated in FIG. 11A, the lanes collector 902 collects all MapsLanes in the LocalLayout by incrementally growing a collection 1106 of valid lanes around the rig 1102 within the LocalLayout 1104. In more detail, at each frame, the lanes collector 902 may retain in the collection 1106 each MapsLane from a preceding frame that remains within the LocalLayout 1104 or horizon of the rig 1102, may add to the collection 1106 each MapsLane that is newly within the LocalLayout 1104 or horizon of the rig 1102, and remove from the collection 1106 each MapsLane retained in or added to the preceding frame that is no longer within the LocalLayout 1104 or horizon of the rig 1102. For example, at Frame 0—which does not have a preceding frame—each of MapsLanes G, H, I, C, D is added to the collection 1106 of valid lanes. As another example, at Frame 1, MapsLane C is retained in the collection 1106, MapsLanes A, B, C, P, Q, and R are newly within the LocalLayout 1104 or horizon of the rig 1102 and are therefore added to the collection 1106, and MapsLanes G, H, I, and D included in the prior frame (Frame 0) are removed from the collection 1106 of valid lanes, shown as invalid lanes 1108 in FIG. 11A. As another example, at Frame 2, MapsLane A is retained in the collection 1106, MapsLanes O, L, K, and J are newly within the LocalLayout 1104 or horizon of the rig 1102 and are therefore added to the collection 1106, and MapsLanes B, C, P, Q, and R included in the prior frame (Frame 1) are removed from the collection 1106 of valid lanes, shown as invalid lanes 1108 in FIG. 11A.

In some implementations, the LaneBuffer may be implemented as a double buffer including a first valid lane buffer and a second valid lane buffer for the collection of valid lanes. For instance, the first valid lane buffer may be populated during a frame with a current incrementally-grown collection of valid lanes while the second valid lane buffer stores a preceding incrementally-grown collection of valid lanes. At a next frame, the roles of the first and second valid lane buffers may switch such that the second valid lane buffer may be populated during the next frame with a new current incrementally-grown collection of valid lanes while the first valid lane buffer stores a preceding incrementally-grown collection of valid lanes (e.g., the previous current incrementally-grown collection of valid lanes). The incremental growth of the collection of valid lanes and the use of the double valid lane buffer may allow SegmentGraphs and/or LaneGraphs to be generated from the preceding incrementally-grown collection of valid lanes while simultaneously incrementally growing the current collection of valid lanes.

FIG. 11B illustrates the SegmentGraph generated at each frame. For example, at Frame 0, the segment graph producer 904 may stitch MapsLanes G, H, and I to a LaneSegment 1106, the MapsLane C to a LaneSegment 1108, and the MapsLane D to a LaneSegment 1110 to generate the SegmentGraph shown at Frame 0. At Frame 1, the segment graph producer 904 may stitch MapsLanes A, B, and C to a LaneSegment 1112 and MapsLanes P, Q, and R to a LaneSegment 1114 to generate the SegmentGraph shown at Frame 1. At Frame 2, the segment graph producer 904 may stitch MapsLane A to a LaneSegment 1116, the MapsLane O to a LaneSegment 1118, and the MapsLanes J, K, and L to a LaneSegment 1120 to generate the SegmentGraph shown at Frame 2. Although not illustrated in FIG. 11B, the SegmentGraph at each frame and/or associated metadata may identify, for each LaneSegment, one or more of a previous LaneSegment, a next LaneSegment, and a contender LaneSegment.

FIG. 11B also illustrates the LaneGraph generated at each frame. For example, at Frame 0, the lane graph producer 906 may compose all combinations of lanes from the LaneSegments 1106, 1108, and 1110 to generate the LaneGraph shown at Frame 0 that includes all path combinations of the LaneSegments 1106, 1108, and 1110 as LaneGraph Lanes 1122 and 1124. At Frame 1, the lane graph producer 906 may compose all combinations of lanes from the LaneSegments 1112, 1114 to generate the LaneGraph shown at Frame 1 that includes all path combinations of the LaneSegments 1112, 1114 as LaneGraph Lanes 1126 and 1128. At Frame 2, the lane graph producer 906 may compose all combinations of lanes from the LaneSegments 1116, 1118, and 1120 to generate the LaneGraph shown at Frame 2 that includes all path combinations of the LaneSegments 1116, 1118, and 1120 as LaneGraph Lanes 1130 and 1132.

FIG. 11B further includes a legend 1134 showing different types of LaneGraph Lanes that may be included in the LaneGraph at one or more of the frames. A LaneGraph Lane on which a vehicle or machine corresponding to the rig 1102 is currently driving is referred to as an "ego-lane". The LaneGraph Lanes 1122, 1126, and 1132 are examples of ego-lanes. A LaneGraph Lane that merges with the ego-lane is referred to as a "merge lane". The LaneGraph Lane 1124 is an example of a merge lane. A LaneGraph Lane that splits from the ego-lane is referred to as a "split lane". The LaneGraph Lane 1130 is an example of a split lane. A LaneGraph Lane that crosses the ego-lane is referred to as a "contender lane". The LaneGraph Lane 1128 is an example of a contender lane.

For safe navigation of an autonomous vehicle, WM frames are typically computed at a rate of about 30 WM frames per second. The large data size of the WM frames can consume significant communication, processing, and/or storage resources on the autonomous vehicle. Accordingly, some embodiments herein separate generation of data, such as WM frames, for the autonomous vehicle into multiple tasks in which tasks with higher latency are performed less frequently than tasks with lower latency. For example, the generation of data may be divided into a higher latency lower frequency WM keyframe generation task and a lower latency higher frequency transformation task. Alternatively or additionally, the tasks may include a lower latency higher frequency transformation computation task. These tasks may repeat or iterate over time. For example, WM keyframes may be computed with a first frequency while other WM frames (e.g., non-keyframes) may be computed with a second frequency that is greater than the first frequency.

Figure 12:
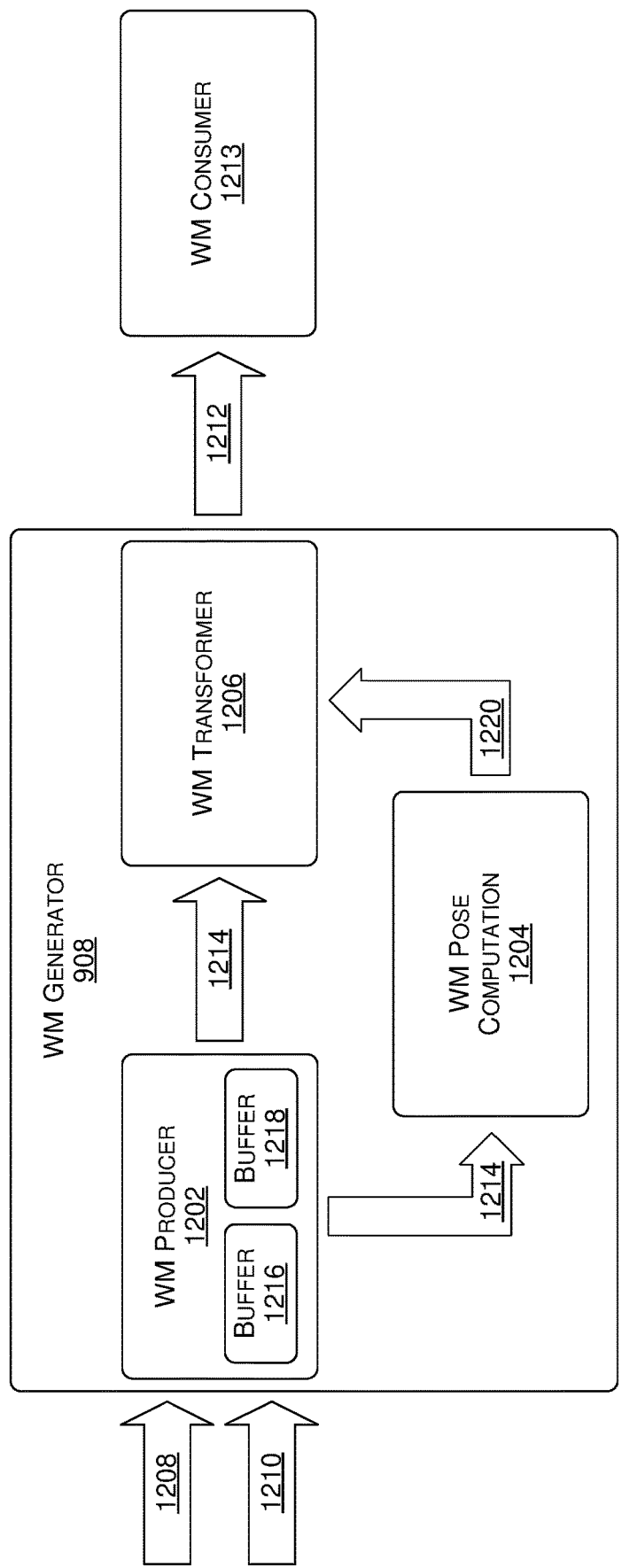
FIG. 12 illustrates an example implementation of a WM generator with three nodes that may be included in the architecture of FIG. 9A, in accordance with one or more embodiments of the present disclosure.

In this and other implementations, the WM generator 908 may be divided into two, three, or some other number of nodes, where each node handles a different one of the tasks according to a corresponding frequency. FIG. 12 illustrates an example implementation of the WM generator 908 with three nodes 1202, 1204, 1206, in accordance with some embodiments of the present disclosure. The three nodes 1202, 1204, 1206 specifically include a WM producer 1202, a WM pose computation node 1204, and a WM transformer 1206.

In general, the WM generator 908 may receive as input LaneGraphs 1208 and localization results 1210 and may output WM frames 1212 to one or more WM consumers 1213. Each localization result 1210 may identify a current location of an autonomous vehicle for a current WM frame 1212. The WM consumer 1213 may include, e.g., the vehicle computing system 120, which may use or consume WM frames 1212 to control operation of a corresponding autonomous vehicle 150 or rig. Alternatively or additionally, the WM consumer 1213 may include some other system, device, application, or the like that uses or consumes WM frames 1212.

The WM producer 1202 may be a high latency (compared to nodes 1204, 1206), low frequency (compared to nodes 1204, 1206) node, while the WM pose computation node 1204 and the WM transformer 1206 may be low latency (compared to node 1202), high frequency (compared to node 1202) nodes.

In general, the WM producer 1202 may compute WM keyframes 1214 from LaneGraphs 1208. The computation of WM keyframes may be a relatively higher latency computation which may be performed by the WM producer 1202 with a first frequency, such as about 10 Hz. According to some implementations, the WM producer 1202 implements a double buffer for the computation of WM keyframes 1214 in which it alternately populates one of two buffers 1216, 1218 with a current WM keyframe while a preceding, e.g., an immediately preceding, WM keyframe 1214 is stored in the other of the two buffers 1216, 1218. The buffers 1216, 1218 may optionally be referred to as world model buffers to distinguish them from other buffers described herein. The buffer 1216, 1218 that stores the preceding WM keyframe 1214 at any given time may be read by the WM pose computation node 1204 and the WM transformer node 1206 in the performance of their respective tasks. When computation of the current WM keyframe is completed, the current WM keyframe becomes the preceding WM keyframe 1214 in the corresponding one of the buffers 1216, 1218, and a new current WM keyframe may be computed by populating the other of the two buffers 1216, 1218 with the new current WM keyframe. In this manner, each of the buffers 1216, 1218 may alternately store the preceding WM keyframe 1214 or be populated with the current WM keyframe during computation of the current WM keyframe.

The WM pose computation node 1204 may compute, with a second frequency and from the localization results 1210 and the preceding WM keyframe 1214, a valid transformation 1220 of the preceding WM keyframe 1214 for each WM frame. The localization results 1210 may include, at any given time and for any given WM frame being generated by the WM generator 908, a current location of the rig. The current location of the rig may be used by the WM pose computation node 1204 to determine a corresponding valid transformation 1220 (e.g., a local map-to-rig transform matrix) that will transform the preceding WM keyframe 1214 to the coordinate frame of the rig. The second frequency may be greater than the first frequency such that multiple valid transformations 1220 may be sequentially computed for a given preceding WM keyframe 1214. In an example in which the first frequency is 10 Hz and the second frequency is 30 Hz, the WM pose computation node 1204 may compute three successive valid transformations 1220 for each preceding WM keyframe 1214.

The WM transformer 1206 may transform the preceding WM keyframe 1214 to the coordinate frame of the rig using the valid transformations 1220. For example, the WM transformer 1206 may sequentially transform the preceding WM keyframe 1214 to the coordinate frame of the rig using sequential valid transformations 1220 to generate sequential WM frames 1212. The WM transformer 1206 may perform the transformations with the second frequency such that any given preceding WM keyframe 1214 may be sequentially transformed multiple times to generate multiple sequential WM frames 1212.

Figure 13:
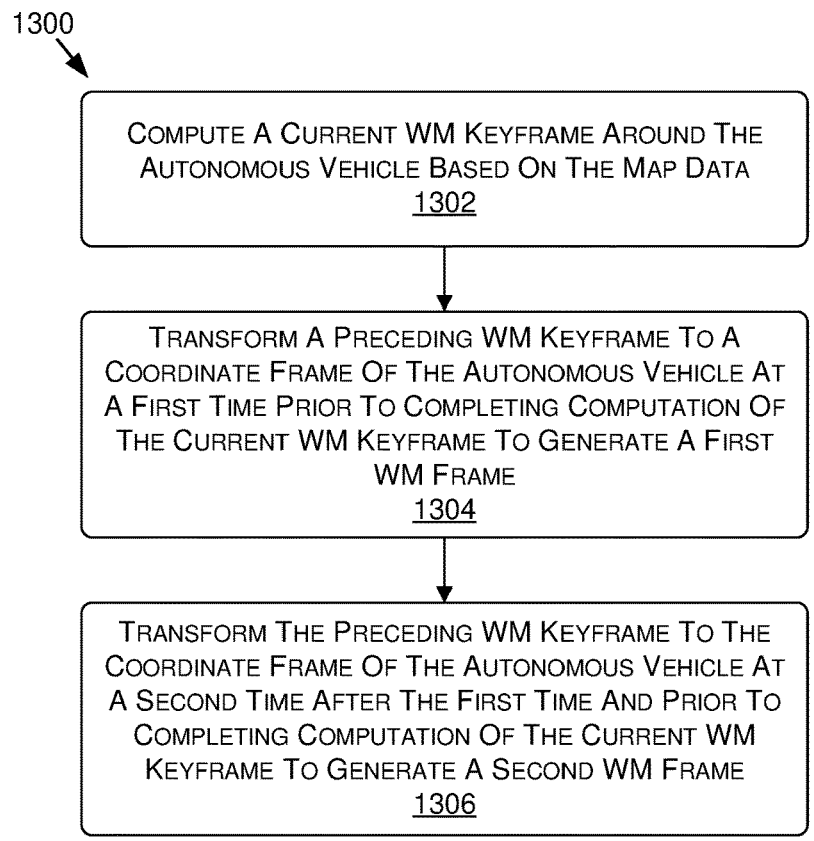
FIG. 13 is a flow diagram showing a method for generating WM frames, in accordance with one or more embodiments of the present disclosure.

FIG. 13 is a flow diagram showing a method 1300 for generating WM frames, in accordance with some embodiments of the present disclosure. Each block of the method 1300 and/or other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In some implementations, the method 1300 and/or other methods described herein are stored on and/or carried out by a vehicle computing system, such as the vehicle computing system 120 described elsewhere herein. For example, the method 1300 may be carried out, at least in part, by the WM generator 908 on the vehicle computing system 120 of the autonomous vehicle 150 or rig.

The method 1300, at block 1302, includes computing a current WM keyframe around the autonomous vehicle based on map data. For example, block 1302 may include the WM producer 1202 of the WM generator 908 computing the current WM keyframe from a current LaneGraph 1208.

The method 1300, at block 1304, includes transforming a preceding WM keyframe to a coordinate frame of the autonomous vehicle at a first time prior to completing computation of the current WM keyframe to generate a first WM frame. For example, block 1304 may include the WM transformer 1206 of the WM generator 908 transforming the preceding WM keyframe 1214 to a coordinate frame of the autonomous vehicle at a first time during and before completion of computation of the current WM keyframe to generate a first WM frame 1212.

The method 1300, at block 1306, includes transforming the preceding WM keyframe to the coordinate frame of the autonomous vehicle at a second time after the first time and prior to completing computation of the current WM keyframe to generate a second WM frame. For example, block 1306 may include the WM transformer 1206 of the WM generator 908 transforming the same preceding WM keyframe 1214 to the coordinate frame of the autonomous vehicle at a second time after the first time and during and before completion of computation of the current WM keyframe to generate a second WM frame 1212.

In some implementations, the method 1300 may further include determining a transformation to apply to the preceding WM keyframe. Transforming the preceding WM keyframe to the coordinate frame of the autonomous vehicle in this example may include transforming the preceding WM keyframe to the coordinate frame of the autonomous vehicle according to the determined transformation. For example, the WM pose computation node 1204 of the WM generator 908 may determine, e.g., compute, a valid transformation 1220 of the preceding WM keyframe 1214 based on the localization result 1214 and the preceding WM keyframe 1214 may be transformed to the coordinate frame of the autonomous vehicle according to the valid transformation 1220.

The map data based on which the current WM keyframe is computed may include, e.g., a lane graph, such as any of the LaneGraphs described herein. Thus, computing the current WM keyframe around the autonomous vehicle based on the map data may include computing the current WM keyframe around the autonomous vehicle based on the lane graph. Some embodiments of the method 1300 may further include generating the lane graph from a portion of an HD map, including incrementally growing a collection of valid lanes around the autonomous vehicle from the portion of the HD map as described with respect to, e.g., FIG. 11A. For example, the incrementally grown collection of valid lanes may be stored in a first valid lane buffer and the method 1300 may further include populating a second valid lane buffer with a current incrementally grown collection of valid lanes.

Alternatively or additionally, the preceding WM keyframe may be stored in a first WM buffer and the method 1300 may further include populating a second WM buffer with the current WM keyframe as the current WM keyframe is computed. As an example, the first WM buffer may include the buffer 1216 of FIG. 12 and the second WM buffer may include the buffer 1218 of FIG. 12. In some embodiments, and after computing the current WM keyframe, the current WM keyframe may be stored in the second WM buffer as a new preceding WM keyframe and the method 1300 may further include, after computing the current WM keyframe, computing a subsequent WM keyframe around the autonomous vehicle based on additional map data (e.g., an updated lane graph), populating the first WM buffer with the subsequent WM keyframe as the subsequent WM keyframe is computed, transforming the new preceding WM keyframe stored in the second WM buffer to the coordinate frame of the autonomous vehicle at a third time prior to completing computation of the subsequent WM keyframe, and transforming the new preceding WM keyframe stored in the second WM buffer to the coordinate frame of the autonomous vehicle at a fourth time after the third time and prior to completing computation of the subsequent WM keyframe.

Figure 14:
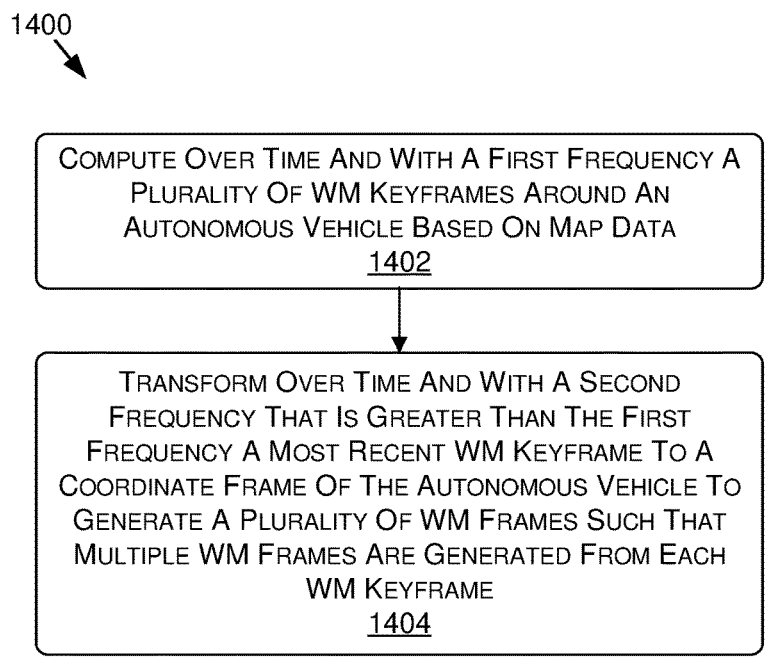
FIG. 14 is a flow diagram showing another method for generating WM frames, in accordance with one or more embodiments of the present disclosure.

FIG. 14 is a flow diagram showing another method 1400 for generating WM frames, in accordance with some embodiments of the present disclosure. Each block of the method 1400 and/or other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In some implementations, the method 1400 and/or other methods described herein are stored on and/or carried out by a vehicle computing system, such as the vehicle computing system 120 described elsewhere herein. For example, the method 1400 may be carried out, at least in part, by the WM generator 908 on the vehicle computing system 120 of the autonomous vehicle 150 or rig.

The method 1400, at block 1402, includes computing over time and with a first frequency WM keyframes around an autonomous vehicle based on map data. For example, block 1302 may include the WM producer 1202 of the WM generator 908 sequentially computing current WM keyframes from a sequence of current LaneGraphs 1208 with a first frequency.

The method 1400, at block 1404, includes transforming over time and with a second frequency that is greater than the first frequency a most recent WM keyframe to a coordinate frame of the autonomous vehicle to generate WM frames such that multiple WM frames are generated from each WM keyframe. For example, block 1404 may include the WM transformer 1206 of the WM generator 908 transforming over time and with the second frequency the sequential preceding (or most recent) WM keyframes 1214 to the coordinate frame of the autonomous vehicle to generate WM keyframes 1212 such that multiple WM keyframes 1212 are generated from each preceding WM keyframe 1214.

In some implementations, the method 1400 may further include determining over time and with the second frequency transformations to apply to the most recent WM keyframe. Transforming over time the most recent (or preceding) WM keyframe to the coordinate frame of the autonomous vehicle in this example may include transforming the most recent WM keyframe to the coordinate frame of the autonomous vehicle according to the determined transformations. For example, the WM pose computation node 1204 of the WM generator 908 may determine, e.g., compute, over time valid transformations 1220 of the preceding WM keyframes 1214 based on the localization result 1214 and the preceding WM keyframes 1214 may be transformed to the coordinate frame of the autonomous vehicle according to the valid transformations 1220.

The map data based on which the WM keyframes are computed may include, e.g., lane graphs, such as any of the LaneGraphs described herein. Thus, computing the WM keyframes around the autonomous vehicle based on the map data may include computing the WM keyframes around the autonomous vehicle based on the lane graphs. Some embodiments of the method 1400 may further include generating the lane graphs from portions of an HD map, including incrementally growing a collection of valid lanes around the autonomous vehicle from the portions of the HD map as described with respect to, e.g., FIG. 11A. Some embodiments of the method 1400 may further include alternately populating a first valid lane buffer and a second valid lane buffer with a collection of valid lanes currently being incrementally grown. In this and other embodiments, the first valid lane buffer may be populated with the collection of valid lanes currently being incrementally grown when a most recent incrementally grown collection of valid lanes is stored in the second valid lane buffer and the second valid lane buffer may be populated with the collection of valid lanes currently being incrementally grown when the most recent incrementally grown collection of valid lanes is stored in the first valid lane buffer.

Alternatively or additionally, the method 1400 may further include alternately populating a first WM buffer and a second world model buffer with the WM keyframes. As an example, the first WM buffer may include the buffer 1216 of FIG. 12 and the second WM buffer may include the buffer 1218 of FIG. 12. The first WM buffer may be populated with a WM keyframe currently being computed when the most recent WM keyframe is stored in the second WM buffer. The second WM buffer may be populated with the WM keyframe currently being computed when the most recent WM keyframe is stored in the first WM buffer.

Compression performance according to some embodiments herein may be significant. It can be assumed that the size of each LaneGraph is significantly larger than the size of each transformation. In this example, compression ratio $R_c$ may simply be the transmission interval of LaneGraphs with static geometry, or laneGraphIntervalFrames. The transmission interval laneGraphIntervalFrames may be related to the size of a RoadSegment roadSegmentLength and vehicle speed vehicleSpeed. In particular, the transmission interval laneGraphIntervalFrames may be determined according to equation 1:

$$laneGraphIntervalFrames = \left(\frac{roadSegmentLength}{vehicleSpeed}\right) * frameRate \quad \text{Eq. 1}$$

Assuming a roadSegmentLength of 20 meters and a vehicleSpeed of 90 miles per hour (or about 40 meters per second), the compression ratio $R_c$ may be approximately (20/40)*20=10. Assuming a vehicleSpeed of 22 miles per hour (or about 10 meters per second) and otherwise similar conditions as in the preceding example, the compression ratio $R_c$ may be approximately (20/10)*20=40. Assuming stop and go traffic and otherwise similar conditions as in the preceding examples, the compression ratio $R_c$ may be 100 or higher.

Accordingly, in either or both of the methods 1300, 1400 or other methods herein, a compression ratio of computing the WM keyframes at the first frequency versus the second frequency may depend on a speed of the autonomous vehicle and may be at least 10, at least 40, at least 100, or some other value.

Example Autonomous Vehicle

Figure 15A:
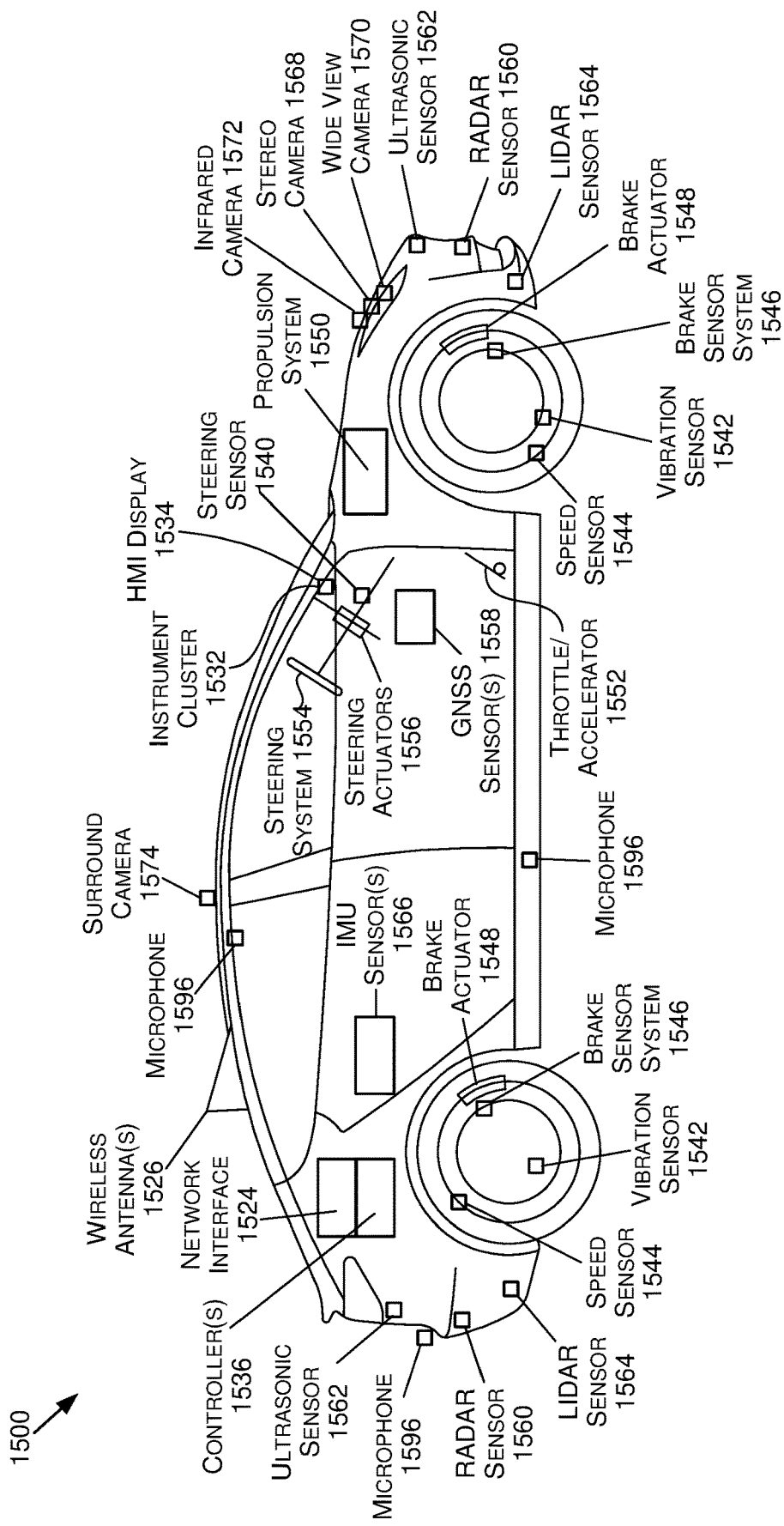
FIG. 15A is an illustration of an example autonomous vehicle, in accordance with some embodiments of the present disclosure.

FIG. 15A is an illustration of an example autonomous vehicle 1500, in accordance with some embodiments of the present disclosure. The autonomous vehicle 1500 (alternatively referred to herein as the "vehicle 1500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1500 may be capable of functionality in accordance with one or more of Level 3—Level 5 of the autonomous driving levels. For example, the vehicle 1500 may be capable of conditional automation (Level 3), high automation (Level 4), and/or full automation (Level 5), depending on the embodiment.

The vehicle 1500 may include components such as a chassis, a vehicle body, wheels (e.g., 2, 4, 6, 8, 18, etc.), tires, axles, and other components of a vehicle. The vehicle 1500 may include a propulsion system 1550, such as an internal combustion engine, hybrid electric power plant, an all-electric engine, and/or another propulsion system type. The propulsion system 1550 may be connected to a drive train of the vehicle 1500, which may include a transmission, to enable the propulsion of the vehicle 1500. The propulsion system 1550 may be controlled in response to receiving signals from the throttle/accelerator 1552.

A steering system 1554, which may include a steering wheel, may be used to steer the vehicle 1500 (e.g., along a desired path or route) when the propulsion system 1550 is operating (e.g., when the vehicle is in motion). The steering system 1554 may receive signals from a steering actuator 1556. The steering wheel may be optional for full automation (Level 5) functionality.

The brake sensor system 1546 may be used to operate the vehicle brakes in response to receiving signals from the brake actuators 1548 and/or brake sensors.

Controller(s) 1536, which may include one or more CPU(s), system on chips (SoCs) 1504 (FIG. 15C) and/or GPU(s), may provide signals (e.g., representative of commands) to one or more components and/or systems of the vehicle 1500. For example, the controller(s) may send signals to operate the vehicle brakes via one or more brake actuators 1548, to operate the steering system 1554 via one or more steering actuators 1556, and/or to operate the propulsion system 1550 via one or more throttle/accelerators 1552. The controller(s) 1536 may include one or more onboard (e.g., integrated) computing devices (e.g., supercomputers) that process sensor signals, and output operation commands (e.g., signals representing commands) to enable autonomous driving and/or to assist a human driver in driving the vehicle 1500. The controller(s) 1536 may include a first controller 1536 for autonomous driving functions, a second controller 1536 for functional safety functions, a third controller 1536 for artificial intelligence functionality (e.g., computer vision), a fourth controller 1536 for infotainment functionality, a fifth controller 1536 for redundancy in emergency conditions, and/or other controllers. In some examples, a single controller 1536 may handle two or more of the above functionalities, two or more controllers 1536 may handle a single functionality, and/or any combination thereof.

The controller(s) 1536 may provide the signals for controlling one or more components and/or systems of the vehicle 1500 in response to sensor data received from one or more sensors (e.g., sensor inputs). The sensor data may be received from, for example and without limitation, global navigation satellite systems sensor(s) 1558 (e.g., Global Positioning System sensor(s)), RADAR sensor(s) 1560, ultrasonic sensor(s) 1562, LIDAR sensor(s) 1564, inertial measurement unit (IMU) sensor(s) 1566 (e.g., accelerometer(s), gyroscope(s), magnetic compass(es), magnetometer(s), etc.), microphone(s) 1596, stereo camera(s) 1568, wide-view camera(s) 1570 (e.g., fisheye cameras), infrared camera(s) 1572, surround camera(s) 1574 (e.g., 360 degree cameras), long-range and/or mid-range camera(s) 1598, speed sensor(s) 1544 (e.g., for measuring the speed of the vehicle 1500), vibration sensor(s) 1542, steering sensor(s) 1540, brake sensor(s) 1546 (e.g., as part of the brake sensor system 1546), and/or other sensor types.

One or more of the controller(s) 1536 may receive inputs (e.g., represented by input data) from an instrument cluster 1532 of the vehicle 1500 and provide outputs (e.g., represented by output data, display data, etc.) via a human-machine interface (HMI) display 1534, an audible annunciator, a loudspeaker, and/or via other components of the vehicle 1500. The outputs may include information such as vehicle velocity, speed, time, map data (e.g., the HD map 1522 of FIG. 15C), location data (e.g., the location of the vehicle 1500, such as on a map), direction, location of other vehicles (e.g., an occupancy grid), information about objects and status of objects as perceived by the controller(s) 1536, etc. For example, the HMI display 1534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1500 further includes a network interface 1524, which may use one or more wireless antenna(s) 1526 and/or modem(s) to communicate over one or more networks. For example, the network interface 1524 may be capable of communication over LTE, WCDMA, UMTS, GSM, CDMA2000, etc. The wireless antenna(s) 1526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LP-WANs), such as LoRaWAN, SigFox, etc.

Figure 15B:
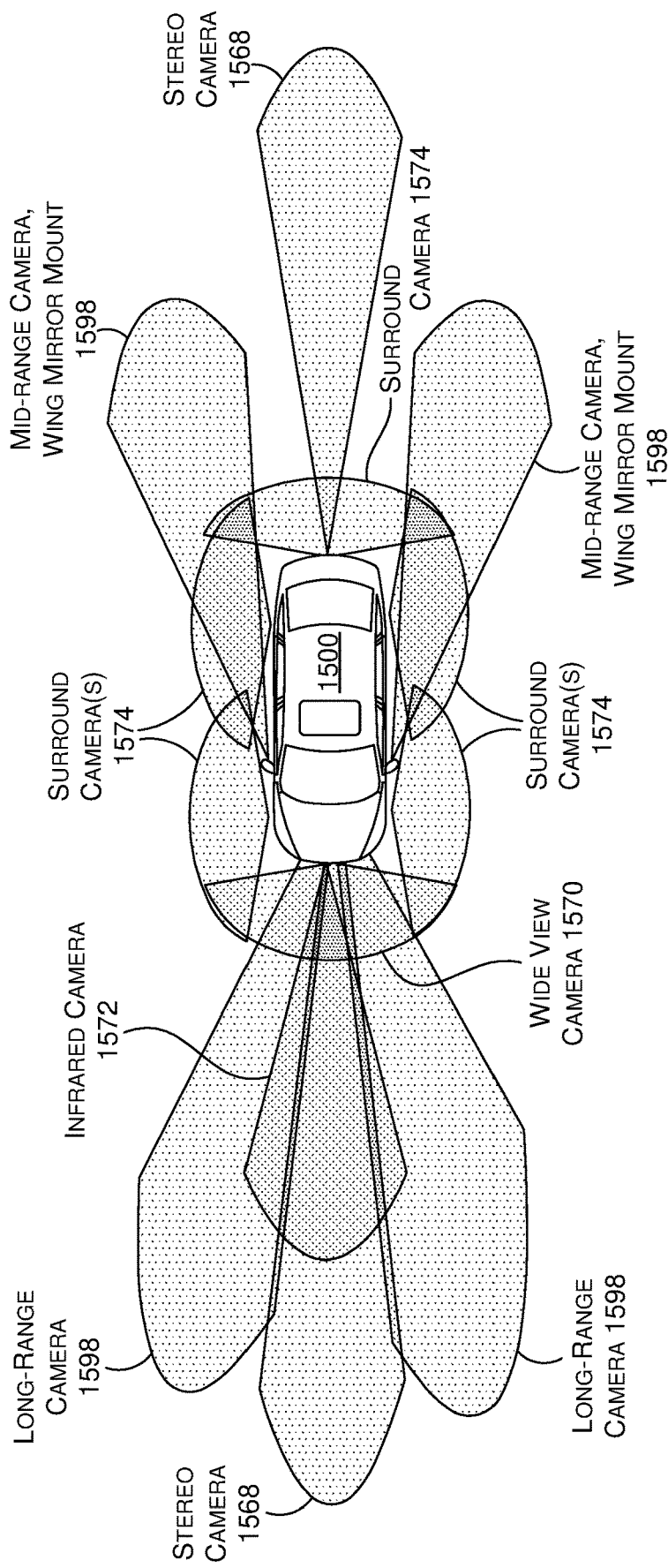
FIG. 15B is an example of camera locations and fields of view for the example autonomous vehicle of FIG. 15A, in accordance with some embodiments of the present disclosure.

FIG. 15B is an example of camera locations and fields of view for the example autonomous vehicle 1500 of FIG. 15A, in accordance with some embodiments of the present disclosure. The cameras and respective fields of view are one example embodiment and are not intended to be limiting. For example, additional and/or alternative cameras may be included and/or the cameras may be located at different locations on the vehicle 1500.

The camera types for the cameras may include, but are not limited to, digital cameras that may be adapted for use with the components and/or systems of the vehicle 1500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 1500 (e.g., front-facing cameras) may be used for surround view, to help identify forward-facing paths and obstacles, as well aid in, with the help of one or more controllers 1536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1570 that may be used to perceive objects coming into view from the periphery (e.g., pedestrians, crossing traffic or bicycles). Although only one wide-view camera is illustrated in FIG. 15B, there may any number of wide-view cameras 1570 on the vehicle 1500. In addition, long-range camera(s) 1598 (e.g., a long-view stereo camera pair) may be used for depth-based object detection, especially for objects for which a neural network has not yet been trained. The long-range camera(s) 1598 may also be used for object detection and classification, as well as basic object tracking.

One or more stereo cameras 1568 may also be included in a front-facing configuration. The stereo camera(s) 1568 may include an integrated control unit comprising a scalable processing unit, which may provide a programmable logic (e.g., FPGA) and a multi-core micro-processor with an integrated CAN or Ethernet interface on a single chip. Such a unit may be used to generate a 3D map of the vehicle's environment, including a distance estimate for all the points in the image. An alternative stereo camera(s) 1568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1568 may be used in addition to, or alternatively from, those described herein.

Cameras with a field of view that includes portions of the environment to the side of the vehicle 1500 (e.g., side-view cameras) may be used for surround view, providing information used to create and update the occupancy grid, as well as to generate side impact collision warnings. For example, surround camera(s) 1574 (e.g., four surround cameras 1574 as illustrated in FIG. 15B) may be positioned around the vehicle 1500. The surround camera(s) 1574 may include wide-view camera(s) 1570, fisheye camera(s), 360-degree camera(s), and/or the like. For example, four fisheye cameras may be positioned on the vehicle's front, rear, and sides. In an alternative arrangement, the vehicle may use three surround camera(s) 1574 (e.g., left, right, and rear), and may leverage one or more other camera(s) (e.g., a forward-facing camera) as a fourth surround-view camera.

Cameras with a field of view that include portions of the environment to the rear of the vehicle 1500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1598, stereo camera(s) 1568), infrared camera(s) 1572, etc.), as described herein.

Figure 15C:
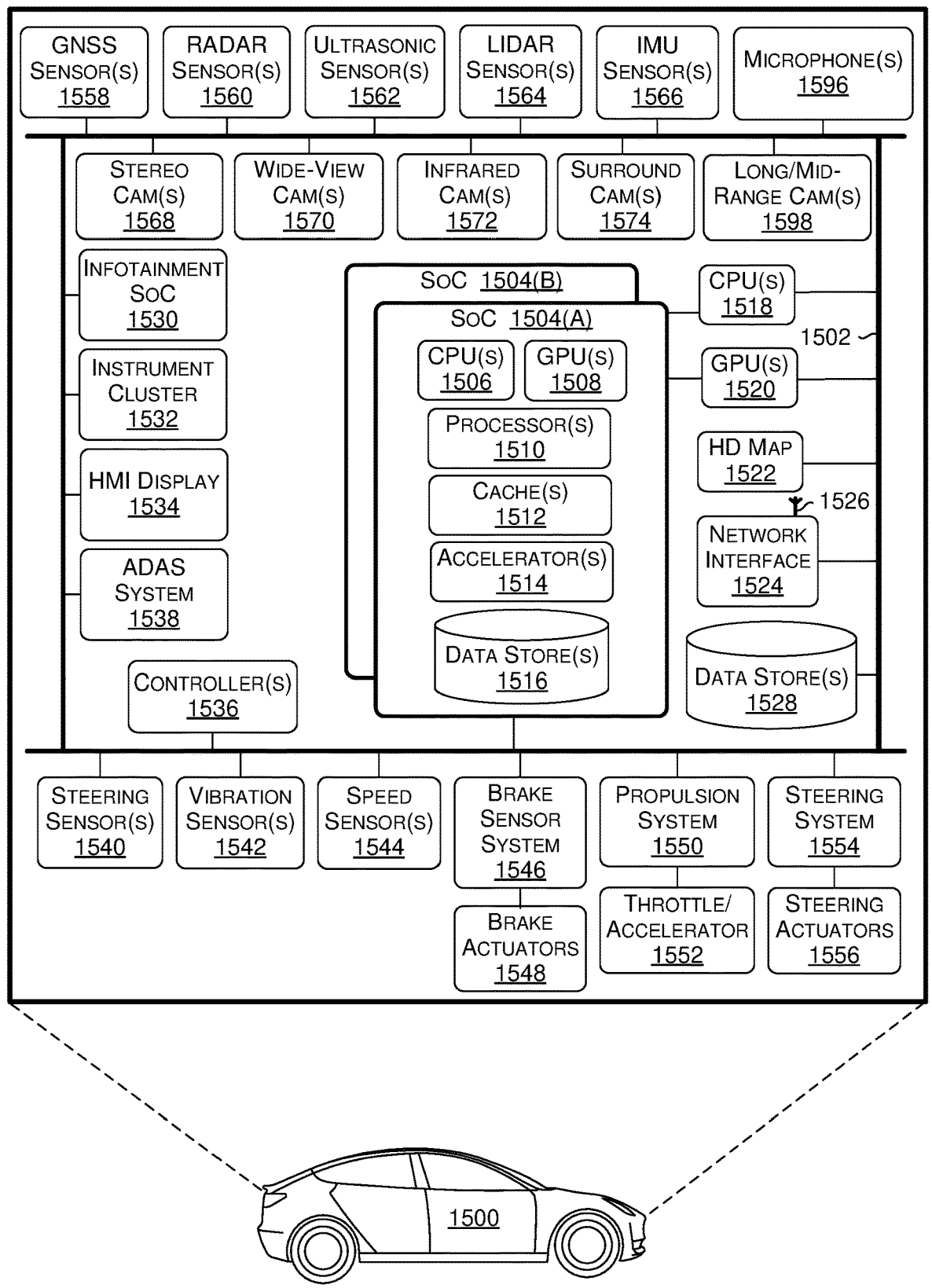
FIG. 15C is a block diagram of an example system architecture for the example autonomous vehicle of FIG. 15A, in accordance with some embodiments of the present disclosure.

FIG. 15C is a block diagram of an example system architecture for the example autonomous vehicle 1500 of FIG. 15A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1500 in FIG. 15C is illustrated as being connected via bus 1502. The bus 1502 may include a Controller Area Network (CAN) data interface (alternatively referred to herein as a "CAN bus"). A CAN may be a network inside the vehicle 1500 used to aid in control of various features and functionality of the vehicle 1500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1502 is described herein as being a CAN bus, this is not intended to be limiting. For example, in addition to, or alternatively from, the CAN bus, FlexRay and/or Ethernet may be used. Additionally, although a single line is used to represent the bus 1502, this is not intended to be limiting. For example, there may be any number of busses 1502, which may include one or more CAN busses, one or more FlexRay busses, one or more Ethernet busses, and/or one or more other types of busses using a different protocol. In some examples, two or more busses 1502 may be used to perform different functions, and/or may be used for redundancy. For example, a first bus 1502 may be used for collision avoidance functionality and a second bus 1502 may be used for actuation control. In any example, each bus 1502 may communicate with any of the components of the vehicle 1500, and two or more busses 1502 may communicate with the same components. In some examples, each SoC 1504, each controller 1536, and/or each computer within the vehicle may have access to the same input data (e.g., inputs from sensors of the vehicle 1500), and may be connected to a common bus, such the CAN bus.

The vehicle 1500 may include one or more controller(s) 1536, such as those described herein with respect to FIG. 15A. The controller(s) 1536 may be used for a variety of functions. The controller(s) 1536 may be coupled to any of the various other components and systems of the vehicle 1500 and may be used for control of the vehicle 1500, artificial intelligence of the vehicle 1500, infotainment for the vehicle 1500, and/or the like.

The vehicle 1500 may include a system(s) on a chip (SoC) 1504. The SoC 1504 may include CPU(s) 1506, GPU(s) 1508, processor(s) 1510, cache(s) 1512, accelerator(s) 1514, data store(s) 1516, and/or other components and features not illustrated. The SoC(s) 1504 may be used to control the vehicle 1500 in a variety of platforms and systems. For example, the SoC(s) 1504 may be combined in a system (e.g., the system of the vehicle 1500) with an HD map 1522 which may obtain map refreshes and/or updates via a network interface 1524 from one or more servers (e.g., server(s) 1578 of FIG. 15D).

The CPU(s) 1506 may include a CPU cluster or CPU complex (alternatively referred to herein as a "CCPLEX"). The CPU(s) 1506 may include multiple cores and/or L2 caches. For example, in some embodiments, the CPU(s) 1506 may include eight cores in a coherent multi-processor configuration. In some embodiments, the CPU(s) 1506 may include four dual-core clusters where each cluster has a dedicated L2 cache (e.g., a 2 MB L2 cache). The CPU(s) 1506 (e.g., the CCPLEX) may be configured to support simultaneous cluster operation enabling any combination of the clusters of the CPU(s) 1506 to be active at any given time.

The CPU(s) 1506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1508 may include an integrated GPU (alternatively referred to herein as an "iGPU"). The GPU(s) 1508 may be programmable and may be efficient for parallel workloads. The GPU(s) 1508, in some examples, may use an enhanced tensor instruction set. The GPU(s) 1508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1508 may include at least eight streaming microprocessors. The GPU(s) 1508 may use computer-based application programming interface(s) (API(s)). In addition, the GPU(s) 1508 may use one or more parallel computing platforms and/or programming models (e.g., NVIDIA's CUDA).

The GPU(s) 1508 may be power-optimized for best performance in automotive and embedded use cases. For example, the GPU(s) 1508 may be fabricated on a Fin field-effect transistor (FinFET). However, this is not intended to be limiting, and the GPU(s) 1508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit to improve performance while simplifying programming.

The GPU(s) 1508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1508 to access the CPU(s) 1506 page tables directly. In such examples, when the GPU(s) 1508 memory management unit (MMU) experiences a miss, an address translation request may be transmitted to the CPU(s) 1506. In response, the CPU(s) 1506 may look in its page tables for the virtual-to-physical mapping for the address and transmits the translation back to the GPU(s)

1508. As such, unified memory technology may allow a single unified virtual address space for memory of both the CPU(s) 1506 and the GPU(s) 1508, thereby simplifying the GPU(s) 1508 programming and porting of applications to the GPU(s) 1508.

In addition, the GPU(s) 1508 may include an access counter that may keep track of the frequency of access of the GPU(s) 1508 to memory of other processors. The access counter may help ensure that memory pages are moved to the physical memory of the processor that is accessing the pages most frequently.

The SoC(s) 1504 may include any number of cache(s) 1512, including those described herein. For example, the cache(s) 1512 may include an L3 cache that is available to both the CPU(s) 1506 and the GPU(s) 1508 (e.g., that is connected to both the CPU(s) 1506 and the GPU(s) 1508). The cache(s) 1512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1504 may include an arithmetic logic unit(s) (ALU(s)) which may be leveraged in performing processing with respect to any of the variety of tasks or operations of the vehicle 1500—such as processing DNNs. In addition, the SoC(s) 1504 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 1506 and/or GPU(s) 1508.

The SoC(s) 1504 may include one or more accelerators 1514 (e.g., hardware accelerators, software accelerators, or a combination thereof). For example, the SoC(s) 1504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1508 and to off-load some of the tasks of the GPU(s) 1508 (e.g., to free up more cycles of the GPU(s) 1508 for performing other tasks). As an example, the accelerator(s) 1514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1508, and by using an inference accelerator, for example, a designer may target either the DLA(s) or the GPU(s) 1508 for any function. For example, the designer may focus processing of CNNs and floating point operations on the DLA(s) and leave other functions to the GPU(s) 1508 and/or other accelerator(s) 1514.

The accelerator(s) 1514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the two or more vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1514 (e.g., the hardware acceleration cluster) may include a computer vision network on-chip and SRAM, for providing a high-bandwidth, low latency SRAM for the accelerator(s) 1514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1566 output that correlates with the vehicle 1500 orientation, distance, 3D location estimates of the object obtained from the neural network and/or other sensors (e.g., LIDAR sensor(s) 1564 or RADAR sensor(s) 1560), among others.

The SoC(s) 1504 may include data store(s) 1516 (e.g., memory). The data store(s) 1516 may be on-chip memory of the SoC(s) 1504, which may store neural networks to be executed on the GPU and/or the DLA. In some examples, the data store(s) 1516 may be large enough in capacity to store multiple instances of neural networks for redundancy and safety. The data store(s) 1516 may comprise L2 or L3 cache(s) 1512. Reference to the data store(s) 1516 may include reference to the memory associated with the PVA, DLA, and/or other accelerator(s) 1514, as described herein.

The SoC(s) 1504 may include one or more processor(s) 1510 (e.g., embedded processors). The processor(s) 1510 may include a boot and power management processor that may be a dedicated processor and subsystem to handle boot power and management functions and related security enforcement. The boot and power management processor may be a part of the SoC(s) 1504 boot sequence and may provide runtime power management services. The boot power and management processor may provide clock and voltage programming, assistance in system low power state transitions, management of SoC(s) 1504 thermals and temperature sensors, and/or management of the SoC(s) 1504 power states. Each temperature sensor may be implemented as a ring-oscillator whose output frequency is proportional to temperature, and the SoC(s) 1504 may use the ring-oscillators to detect temperatures of the CPU(s) 1506, GPU(s) 1508, and/or accelerator(s) 1514. If temperatures are determined to exceed a threshold, the boot and power management processor may enter a temperature fault routine and put the SoC(s) 1504 into a lower power state and/or put the vehicle 1500 into a chauffeur to safe-stop mode (e.g., bring the vehicle 1500 to a safe stop).

The processor(s) 1510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1510 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 1510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1510 may further include a real-time camera engine that may include a dedicated processor subsystem for handling real-time camera management.

The processor(s) 1510 may further include a high dynamic range signal processor that may include an image signal processor that is a hardware engine that is part of the camera processing pipeline.

The processor(s) 1510 may include a video image compositor that may be a processing block (e.g., implemented on a microprocessor) that implements video post-processing functions needed by a video playback application to produce the final image for the player window. The video image compositor may perform lens distortion correction on wide-view camera(s) 1570, surround camera(s) 1574, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1508 is not required to continuously render new surfaces. Even when the GPU(s) 1508 is powered on and actively performing 3D rendering, the video image compositor may be used to offload the GPU(s) 1508 to improve performance and responsiveness.

The SoC(s) 1504 may further include a mobile industry processor interface (MIPI) camera serial interface for receiving video and input from cameras, a high-speed interface, and/or a video input block that may be used for camera and related pixel input functions. The SoC(s) 1504 may further include an input/output controller(s) that may be controlled by software and may be used for receiving I/O signals that are uncommitted to a specific role.

The SoC(s) 1504 may further include a broad range of peripheral interfaces to enable communication with peripherals, audio codecs, power management, and/or other devices. The SoC(s) 1504 may be used to process data from cameras (e.g., connected over Gigabit Multimedia Serial Link and Ethernet), sensors (e.g., LIDAR sensor(s) 1564, RADAR sensor(s) 1560, etc. that may be connected over Ethernet), data from bus 1502 (e.g., speed of vehicle 1500, steering wheel position, etc.), data from GNSS sensor(s) 1558 (e.g., connected over Ethernet or CAN bus). The SoC(s) 1504 may further include dedicated high-performance mass storage controllers that may include their own DMA engines, and that may be used to free the CPU(s) 1506 from routine data management tasks.

The SoC(s) 1504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1504 may be faster, more reliable, and even more energy-efficient and space-efficient than conventional systems. For example, the accelerator(s) 1514, when combined with the CPU(s) 1506, the GPU(s) 1508, and the data store(s) 1516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1520) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1508.

In some examples, a CNN for facial recognition and vehicle owner identification may use data from camera sensors to identify the presence of an authorized driver and/or owner of the vehicle 1500. The always-on sensor processing engine may be used to unlock the vehicle when the owner approaches the driver door and turn on the lights, and, in security mode, to disable the vehicle when the owner leaves the vehicle. In this way, the SoC(s) 1504 provide for security against theft and/or carjacking.

In another example, a CNN for emergency vehicle detection and identification may use data from microphones 1596 to detect and identify emergency vehicle sirens. In contrast to conventional systems, which use general classifiers to detect sirens and manually extract features, the SoC(s) 1504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1562, until the emergency vehicle(s) passes.

The vehicle may include a CPU(s) 1518 (e.g., discrete CPU(s), or dCPU(s)), that may be coupled to the SoC(s) 1504 via a high-speed interconnect (e.g., PCIe). The CPU(s) 1518 may include an X86 processor, for example. The CPU(s) 1518 may be used to perform any of a variety of functions, including arbitrating potentially inconsistent results between ADAS sensors and the SoC(s) 1504, and/or monitoring the status and health of the controller(s) 1536 and/or infotainment SoC 1530, for example.

The vehicle 1500 may include a GPU(s) 1520 (e.g., discrete GPU(s), or dGPU(s)), that may be coupled to the SoC(s) 1504 via a high-speed interconnect (e.g., NVIDIA's NVLINK). The GPU(s) 1520 may provide additional artificial intelligence functionality, such as by executing redundant and/or different neural networks, and may be used to train and/or update neural networks based on input (e.g., sensor data) from sensors of the vehicle 1500.

The vehicle 1500 may further include the network interface 1524 which may include one or more wireless antennas 1526 (e.g., one or more wireless antennas for different communication protocols, such as a cellular antenna, a Bluetooth antenna, etc.). The network interface 1524 may be used to enable wireless connectivity over the Internet with the cloud (e.g., with the server(s) 1578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1500 information about vehicles in proximity to the vehicle 1500 (e.g., vehicles in front of, on the side of, and/or behind the vehicle 1500). This functionality may be part of a cooperative adaptive cruise control functionality of the vehicle 1500.

The network interface 1524 may include an SoC that provides modulation and demodulation functionality and enables the controller(s) 1536 to communicate over wireless networks. The network interface 1524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1500 may further include data store(s) 1528, which may include off-chip (e.g., off the SoC(s) 1504) storage. The data store(s) 1528 may include one or more storage elements including RAM, SRAM, DRAM, VRAM, Flash, hard disks, and/or other components and/or devices that may store at least one bit of data.

The vehicle 1500 may further include GNSS sensor(s) 1558 (e.g., GPS and/or assisted GPS sensors), to assist in mapping, perception, occupancy grid generation, and/or path planning functions. Any number of GNSS sensor(s) 1558 may be used, including, for example and without limitation, a GPS using a USB connector with an Ethernet to serial (RS-232) bridge.

The vehicle 1500 may further include RADAR sensor(s) 1560. The RADAR sensor(s) 1560 may be used by the vehicle 1500 for long-range vehicle detection, even in darkness and/or severe weather conditions. RADAR functional safety levels may be ASIL B. The RADAR sensor(s) 1560 may use the CAN and/or the bus 1502 (e.g., to transmit data generated by the RADAR sensor(s) 1560) for control and to access object tracking data, with access to Ethernet to access raw data, in some examples. A wide variety of RADAR sensor types may be used. For example, and without limitation, the RADAR sensor(s) 1560 may be suitable for front, rear, and side RADAR use. In some example, Pulse Doppler RADAR sensor(s) are used.

The RADAR sensor(s) 1560 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 1500 at higher speeds with minimal interference from traffic in adjacent lanes. The other two antennae may expand the field of view, making it possible to quickly detect vehicles entering or leaving the vehicle's 1500 lane.

Mid-range RADAR systems may include, as an example, a range of up to 1560 m (front) or 80 m (rear), and a field of view of up to 42 degrees (front) or 1550 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 1500 may further include ultrasonic sensor(s) 1562. The ultrasonic sensor(s) 1562, which may be positioned at the front, back, and/or the sides of the vehicle 1500, may be used for park assist and/or to create and update an occupancy grid. A wide variety of ultrasonic sensor(s) 1562 may be used, and different ultrasonic sensor(s) 1562 may be used for different ranges of detection (e.g., 2.5 m, 4 m). The ultrasonic sensor(s) 1562 may operate at functional safety levels of ASIL B.

The vehicle 1500 may include LIDAR sensor(s) 1564. The LIDAR sensor(s) 1564 may be used for object and pedestrian detection, emergency braking, collision avoidance, and/or other functions. The LIDAR sensor(s) 1564 may be functional safety level ASIL B. In some examples, the vehicle 1500 may include multiple LIDAR sensors 1564 (e.g., two, four, six, etc.) that may use Ethernet (e.g., to provide data to a Gigabit Ethernet switch).

In some examples, the LIDAR sensor(s) 1564 may be capable of providing a list of objects and their distances for a 360-degree field of view. Commercially available LIDAR sensor(s) 1564 may have an advertised range of approximately 100 m, with an accuracy of 2 cm-3 cm, and with support for a 100 Mbps Ethernet connection, for example. In some examples, one or more non-protruding LIDAR sensors 1564 may be used. In such examples, the LIDAR sensor(s) 1564 may be implemented as a small device that may be embedded into the front, rear, sides, and/or corners of the vehicle 1500. The LIDAR sensor(s) 1564, in such examples, may provide up to a 120-degree horizontal and 35-degree vertical field-of-view, with a 200 m range even for low-reflectivity objects. Front-mounted LIDAR sensor(s) 1564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1500. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1564 may be less susceptible to motion blur, vibration, and/or shock.

The vehicle may further include IMU sensor(s) 1566. The IMU sensor(s) 1566 may be located at a center of the rear axle of the vehicle 1500, in some examples. The IMU sensor(s) 1566 may include, for example and without limitation, an accelerometer(s), a magnetometer(s), a gyroscope(s), a magnetic compass(es), and/or other sensor types. In some examples, such as in six-axis applications, the IMU sensor(s) 1566 may include accelerometers and gyroscopes, while in nine-axis applications, the IMU sensor(s) 1566 may include accelerometers, gyroscopes, and magnetometers.

In some embodiments, the IMU sensor(s) 1566 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1566 may enable the vehicle 1500 to estimate heading without requiring input from a magnetic sensor by directly observing and correlating the changes in velocity from GPS to the IMU sensor(s) 1566. In some examples, the IMU sensor(s) 1566 and the GNSS sensor(s) 1558 may be combined in a single integrated unit.

The vehicle may include microphone(s) 1596 placed in and/or around the vehicle 1500. The microphone(s) 1596 may be used for emergency vehicle detection and identification, among other things.

The vehicle may further include any number of camera types, including stereo camera(s) 1568, wide-view camera(s) 1570, infrared camera(s) 1572, surround camera(s) 1574, long-range and/or mid-range camera(s) 1598, and/or other camera types. The cameras may be used to capture image data around an entire periphery of the vehicle 1500. The types of cameras used depends on the embodiments and requirements for the vehicle 1500, and any combination of camera types may be used to provide the necessary coverage around the vehicle 1500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 15A and FIG. 15B.

The vehicle 1500 may further include vibration sensor(s) 1542. The vibration sensor(s) 1542 may measure vibrations of components of the vehicle, such as the axle(s). For example, changes in vibrations may indicate a change in road surfaces. In another example, when two or more vibration sensors 1542 are used, the differences between the vibrations may be used to determine friction or slippage of the road surface (e.g., when the difference in vibration is between a power-driven axle and a freely rotating axle).

The vehicle 1500 may include an ADAS system 1538. The ADAS system 1538 may include an SoC, in some examples. The ADAS system 1538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1560, LIDAR sensor(s) 1564, and/or a camera(s). The ACC systems may include longitudinal ACC and/or lateral ACC. Longitudinal ACC monitors and controls the distance to the vehicle immediately ahead of the vehicle 1500 and automatically adjusts the vehicle speed to maintain a safe distance from vehicles ahead. Lateral ACC performs distance keeping, and advises the vehicle 1500 to change lanes when necessary. Lateral ACC is related to other ADAS applications such as LC and CWS.

CACC uses information from other vehicles that may be received via the network interface 1524 and/or the wireless antenna(s) 1526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 1500), while the I2V communication concept provides information about traffic farther ahead. CACC systems may include either or both I2V and V2V information sources. Given the information of the vehicles ahead of the vehicle 1500, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 1560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1500 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1500 if the vehicle 1500 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1500 is backing up. Some RCTW systems include AEB to ensure that the vehicle brakes are applied to avoid a crash. RCTW systems may use one or more rear-facing RADAR sensor(s) 1560, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 1500, the vehicle 1500 itself must, in the case of conflicting results, decide whether to heed the result from a primary computer or a secondary computer (e.g., a first controller 1536 or a second controller 1536). For example, in some embodiments, the ADAS system 1538 may be a backup and/or secondary computer for providing perception information to a backup computer rationality module. The backup computer rationality monitor may run a redundant diverse software on hardware components to detect faults in perception and dynamic driving tasks. Outputs from the ADAS system 1538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1504.

In other examples, ADAS system 1538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 1538 may be fed into the primary computer's perception block and/or the primary computer's dynamic driving task block. For example, if the ADAS system 1538 indicates a forward crash warning due to an object immediately ahead, the perception block may use this information when identifying objects. In other examples, the secondary computer may have its own neural network that is trained and thus reduces the risk of false positives, as described herein.

The vehicle 1500 may further include the infotainment SoC 1530 (e.g., an in-vehicle infotainment system (IVI)). Although illustrated and described as an SoC, the infotainment system may not be a SoC, and may include two or more discrete components. The infotainment SoC 1530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 1500. For example, the infotainment SoC 1530 may include radios, disk players, navigation systems, video players, USB and Bluetooth connectivity, carputers, in-car entertainment, Wi-Fi, steering wheel audio controls, hands-free voice control, a heads-up display (HUD), an HMI display 1534, a telematics device, a control panel (e.g., for controlling and/or interacting with various components, features, and/or systems), and/or other components. The infotainment SoC 1530 may further be used to provide information (e.g., visual and/or audible) to a user(s) of the vehicle, such as information from the ADAS system 1538, autonomous driving information such as planned vehicle maneuvers, trajectories, surrounding environment information (e.g., intersection information, vehicle information, road information, etc.), and/or other information.

The infotainment SoC 1530 may include GPU functionality. The infotainment SoC 1530 may communicate over the bus 1502 (e.g., CAN bus, Ethernet, etc.) with other devices, systems, and/or components of the vehicle 1500. In some examples, the infotainment SoC 1530 may be coupled to a supervisory MCU such that the GPU of the infotainment system may perform some self-driving functions in the event that the primary controller(s) 1536 (e.g., the primary and/or backup computers of the vehicle 1500) fail. In such an example, the infotainment SoC 1530 may put the vehicle 1500 into a chauffeur to safe-stop mode, as described herein.

The vehicle 1500 may further include an instrument cluster 1532 (e.g., a digital dash, an electronic instrument cluster, a digital instrument panel, etc.). The instrument cluster 1532 may include a controller and/or supercomputer (e.g., a discrete controller or supercomputer). The instrument cluster 1532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1530 and the instrument cluster 1532. In other words, the instrument cluster 1532 may be included as part of the infotainment SoC 1530, or vice versa.

Figure 15D:
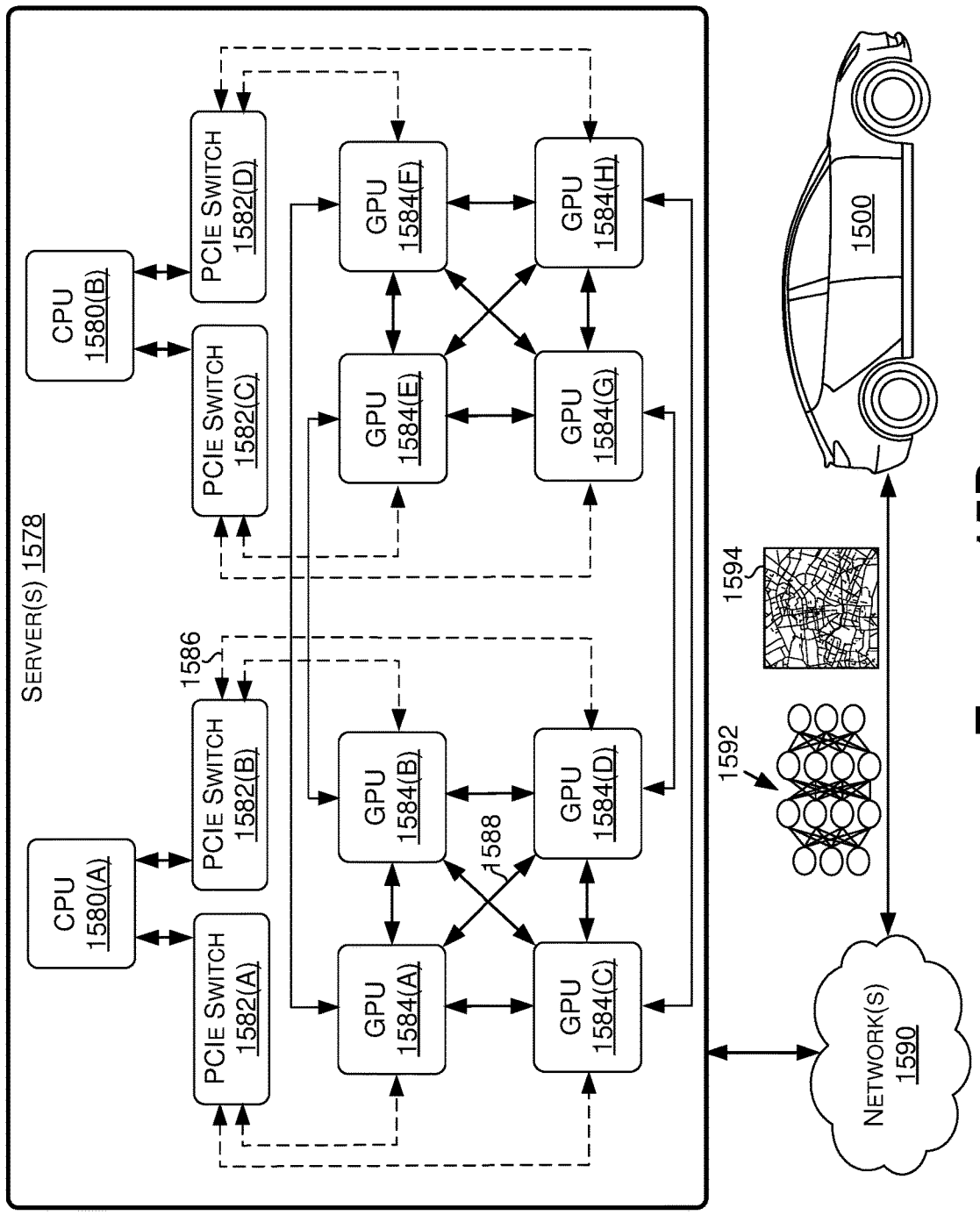
FIG. 15D is a system diagram for communication between cloud-based server(s) and the example autonomous vehicle of FIG. 15A, in accordance with some embodiments of the present disclosure.

FIG. 15D is a system diagram for communication between cloud-based server(s) and the example autonomous vehicle 1500 of FIG. 15A, in accordance with some embodiments of the present disclosure. The system 1576 may include server(s) 1578, network(s) 1590, and vehicles, including the vehicle 1500. The server(s) 1578 may include two or more GPUs 1584(A)-1584(H) (collectively referred to herein as GPUs 1584), PCIe switches 1582(A)-1582(H) (collectively referred to herein as PCIe switches 1582), and/or CPUs 1580(A)-1580(B) (collectively referred to herein as CPUs 1580). The GPUs 1584, the CPUs 1580, and the PCIe switches may be interconnected with high-speed interconnects such as, for example and without limitation, NVLink interfaces 1588 developed by NVIDIA and/or PCIe connections 1586. In some examples, the GPUs 1584 are connected via NVLink and/or NVSwitch SoC and the GPUs 1584 and the PCIe switches 1582 are connected via PCIe interconnects. Although eight GPUs 1584, two CPUs 1580, and four PCIe switches 1582 are illustrated, this is not intended to be limiting. Depending on the embodiment, each of the server(s) 1578 may include any number of GPUs 1584, CPUs 1580, and/or PCIe switches 1582. For example, the server(s) 1578 may each include eight, sixteen, thirty-two, and/or more GPUs 1584.

The server(s) 1578 may receive, over the network(s) 1590 and from the vehicles, image data representative of images showing unexpected or changed road conditions, such as recently commenced roadwork. The server(s) 1578 may transmit, over the network(s) 1590 and to the vehicles, neural networks 1592, updated neural networks 1592, and/or map information 1594, including information regarding traffic and road conditions. The updates to the map information 1594 may include updates for the HD map 1522, such as information regarding construction sites, potholes, detours, flooding, and/or other obstructions. In some examples, the neural networks 1592, the updated neural networks 1592, and/or the map information 1594 may have resulted from new training and/or experiences represented in data received from any number of vehicles in the environment, and/or based on training performed at a datacenter (e.g., using the server(s) 1578 and/or other servers).

The server(s) 1578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1590, and/or the machine learning models may be used by the server(s) 1578 to remotely monitor the vehicles.

In some examples, the server(s) 1578 may receive data from the vehicles and apply the data to up-to-date real-time neural networks for real-time intelligent inferencing. The server(s) 1578 may include deep-learning supercomputers and/or dedicated AI computers powered by GPU(s) 1584, such as a DGX and DGX Station machines developed by NVIDIA. However, in some examples, the server(s) 1578 may include deep learning infrastructure that use only CPU-powered datacenters.

The deep-learning infrastructure of the server(s) 1578 may be capable of fast, real-time inferencing, and may use that capability to evaluate and verify the health of the processors, software, and/or associated hardware in the vehicle 1500. For example, the deep-learning infrastructure may receive periodic updates from the vehicle 1500, such as a sequence of images and/or objects that the vehicle 1500 has located in that sequence of images (e.g., via computer vision and/or other machine learning object classification techniques). The deep-learning infrastructure may run its own neural network to identify the objects and compare them with the objects identified by the vehicle 1500 and, if the results do not match and the infrastructure concludes that the AI in the vehicle 1500 is malfunctioning, the server(s) 1578 may transmit a signal to the vehicle 1500 instructing a fail-safe computer of the vehicle 1500 to assume control, notify the passengers, and complete a safe parking maneuver.

For inferencing, the server(s) 1578 may include the GPU(s) 1584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 16:
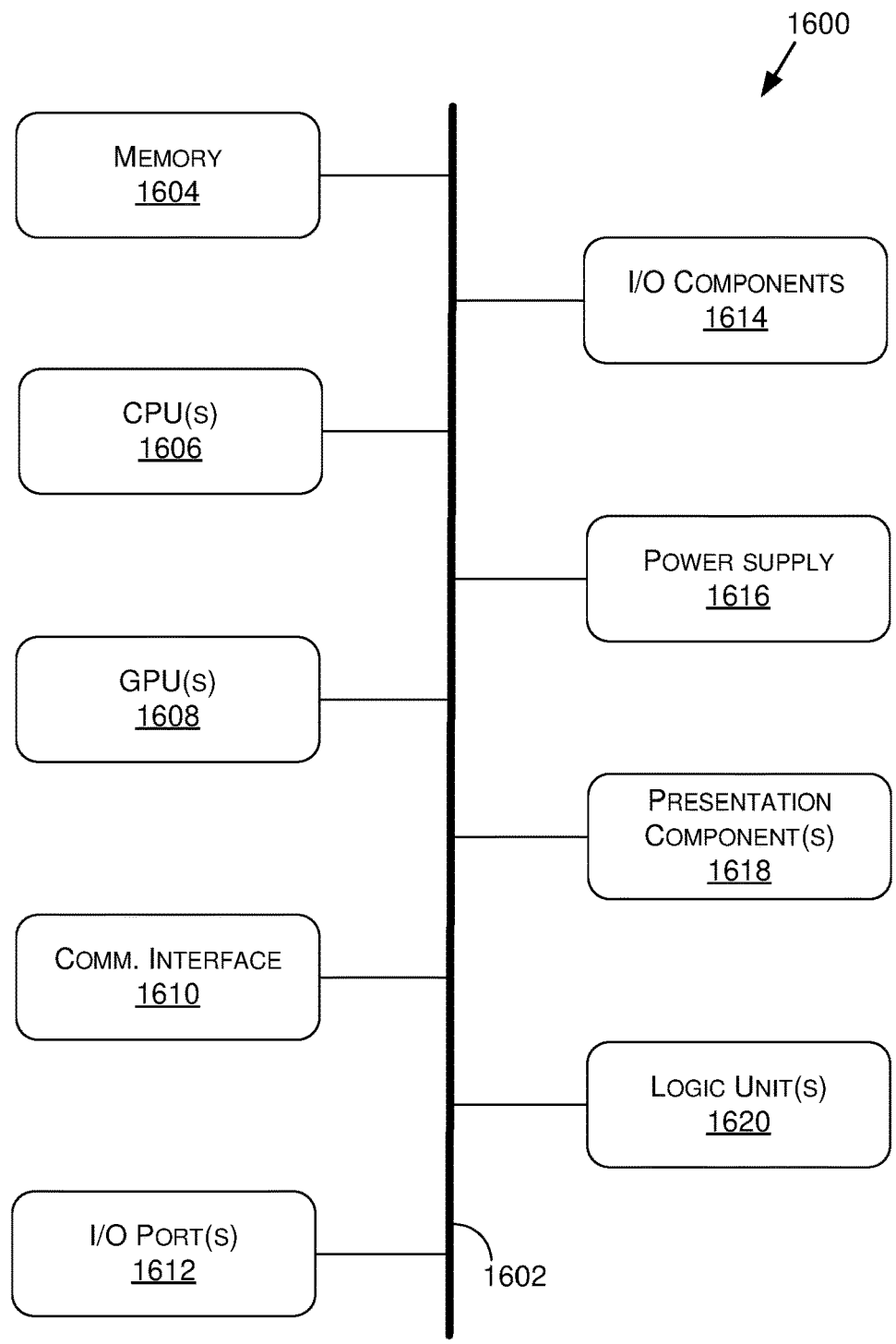
FIG. 16 is a block diagram of an example computing device suitable for use in implementing some embodiments of the present disclosure.

FIG. 16 is a block diagram of an example computing device(s) 1600 suitable for use in implementing some embodiments of the present disclosure. Computing device 1600 may include an interconnect system 1602 that directly or indirectly couples the following devices: memory 1604, one or more central processing units (CPUs) 1606, one or more graphics processing units (GPUs) 1608, a communication interface 1610, I/O ports 1612, input/output components 1614, a power supply 1616, one or more presentation components 1618 (e.g., display(s)), and one or more logic units 1620.

Although the various blocks of FIG. 16 are shown as connected via the interconnect system 1602 with lines, this is not intended to be limiting and is for clarity only. For example, in some embodiments, a presentation component 1618, such as a display device, may be considered an I/O component 1614 (e.g., if the display is a touch screen). As another example, the CPUs 1606 and/or GPUs 1608 may include memory (e.g., the memory 1604 may be representative of a storage device in addition to the memory of the GPUs 1608, the CPUs 1606, and/or other components). In other words, the computing device of FIG. 16 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 16.

The interconnect system 1602 may represent one or more links or busses, such as an address bus, a data bus, a control bus, or a combination thereof. The interconnect system 1602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1606 may be directly connected to the memory 1604. Further, the CPU 1606 may be directly connected to the GPU 1608. Where there is direct, or point-to-point, connection between components, the interconnect system 1602 may include a PCIe link to carry out the connection. In these examples, a PCI bus need not be included in the computing device 1600.

The memory 1604 may include any of a variety of computer-readable media. The computer-readable media may be any available media that may be accessed by the computing device 1600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1604 may store computer-readable instructions (e.g., that represent a program(s) and/or a program element(s), such as an operating system). Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 1600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1606 may be configured to execute at least some of the computer-readable instructions to control one or more components of the computing device 1600 to perform one or more of the methods and/or processes described herein. The CPU(s) 1606 may each include one or more cores (e.g., one, two, four, eight, twenty-eight, seventy-two, etc.) that are capable of handling a multitude of software threads simultaneously. The CPU(s) 1606 may include any type of processor, and may include different types of processors depending on the type of computing device 1600 implemented (e.g., processors with fewer cores for mobile devices and processors with more cores for servers). For example, depending on the type of computing device 1600, the processor may be an Advanced RISC Machines (ARM) processor implemented using Reduced Instruction Set Computing (RISC) or an x86 processor implemented using Complex Instruction Set Computing (CISC). The computing device 1600 may include one or more CPUs 1606 in addition to one or more microprocessors or supplementary co-processors, such as math co-processors.

In addition to or alternatively from the CPU(s) 1606, the GPU(s) 1608 may be configured to execute at least some of the computer-readable instructions to control one or more components of the computing device 1600 to perform one or more of the methods and/or processes described herein. One or more of the GPU(s) 1608 may be an integrated GPU (e.g., with one or more of the CPU(s) 1606 and/or one or more of the GPU(s) 1608 may be a discrete GPU. In embodiments, one or more of the GPU(s) 1608 may be a coprocessor of one or more of the CPU(s) 1606. The GPU(s) 1608 may be used by the computing device 1600 to render graphics (e.g., 3D graphics) or perform general purpose computations. For example, the GPU(s) 1608 may be used for General-Purpose computing on GPUs (GPGPU). The GPU(s) 1608 may include hundreds or thousands of cores that are capable of handling hundreds or thousands of software threads simultaneously. The GPU(s) 1608 may generate pixel data for output images in response to rendering commands (e.g., rendering commands from the CPU(s) 1606 received via a host interface). The GPU(s) 1608 may include graphics memory, such as display memory, for storing pixel data or any other suitable data, such as GPGPU data. The display memory may be included as part of the memory 1604. The GPU(s) 1608 may include two or more GPUs operating in parallel (e.g., via a link). The link may directly connect the GPUs (e.g., using NVLINK) or may connect the GPUs through a switch (e.g., using NVSwitch). When combined together, each GPU 1608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1606 and/or the GPU(s) 1608, the logic unit(s) 1620 may be configured to execute at least some of the computer-readable instructions to control one or more components of the computing device 1600 to perform one or more of the methods and/or processes described herein. In embodiments, the CPU(s) 1606, the GPU(s) 1608, and/or the logic unit(s) 1620 may discretely or jointly perform any combination of the methods, processes and/or portions thereof. One or more of the logic units 1620 may be part of and/or integrated in one or more of the CPU(s) 1606 and/or the GPU(s) 1608 and/or one or more of the logic units 1620 may be discrete components or otherwise external to the CPU(s) 1606 and/or the GPU(s) 1608. In embodiments, one or more of the logic units 1620 may be a coprocessor of one or more of the CPU(s) 1606 and/or one or more of the GPU(s) 1608.

Examples of the logic unit(s) 1620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 1610 may include one or more receivers, transmitters, and/or transceivers that enable the computing device 1600 to communicate with other computing devices via an electronic communication network, including wired and/or wireless communications. The communication interface 1610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1612 may enable the computing device 1600 to be logically coupled to other devices including the I/O components 1614, the presentation component(s) 1618, and/or other components, some of which may be built into (e.g., integrated in) the computing device 1600. Illustrative I/O components 1614 include a microphone, mouse, keyboard, joystick, game pad, game controller, satellite dish, scanner, printer, wireless device, etc. The I/O components 1614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1600. The computing device 1600 may include depth cameras, such as stereoscopic camera systems, infrared camera systems, RGB camera systems, touchscreen technology, and combinations of these, for gesture detection and recognition. Additionally, the computing device 1600 may include accelerometers or gyroscopes (e.g., as part of an inertia measurement unit (IMU)) that enable detection of motion. In some examples, the output of the accelerometers or gyroscopes may be used by the computing device 1600 to render immersive augmented reality or virtual reality.

The power supply 1616 may include a hard-wired power supply, a battery power supply, or a combination thereof. The power supply 1616 may provide power to the computing device 1600 to enable the components of the computing device 1600 to operate.

The presentation component(s) 1618 may include a display (e.g., a monitor, a touch screen, a television screen, a heads-up-display (HUD), other display types, or a combination thereof), speakers, and/or other presentation components. The presentation component(s) 1618 may receive data from other components (e.g., the GPU(s) 1608, the CPU(s) 1606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Additionally, use of the term "based on" should not be interpreted as "only based on" or "based only on." Rather, a first element being "based on" a second element includes instances in which the first element is based on the second element alone or on the second element and one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
   determining, at a first frequency and based at least on map data, a plurality of keyframes corresponding to a world model that is representative of one or more areas around a vehicle; and
   generating, at a second frequency greater than a first frequency, a plurality of world model frames corresponding to the world model based at least on a particular keyframe of the plurality of keyframes and a plurality of localization results determined with respect to the vehicle, the generating of individual world model frames of the plurality of world model frames including spatially transforming the particular keyframe to a coordinate frame of reference of the vehicle based at least on an individual localization result of the plurality of localization results.

2. The method of claim 1, wherein spatially transforming the particular keyframe to the coordinate frame of reference comprises spatially transforming the particular keyframe to the coordinate frame of reference according to one or more spatial transformations determined over time and according to the second frequency.

3. The method of claim 1, wherein the plurality of keyframes are determined based at least on a plurality of lane graphs.

4. The method of claim 3, further comprising, generating the plurality of lane graphs based at least on one or more portions of the map data that correspond to a plurality of portions of a high definition (HD) map, wherein the generating comprises incrementally growing a collection of valid lanes around the vehicle based at least on the one or more portions of the map data.

5. The method of claim 4, wherein incrementally growing the collection of valid lanes around the vehicle comprises, for at least two sequential time frames in a plurality of time frames includes:
   retaining in the collection at least one lane from a preceding time frame that remains within a horizon of the vehicle, the horizon being represented as a perimeter of a predefined area centered on the vehicle;
   adding to the collection each lane newly within the horizon; and
   removing from the collection at least one lane retained in or added to the preceding time frame that is no longer within the horizon.

6. The method of claim 4, further comprising alternately populating a first valid lane buffer and a second valid lane buffer with a collection of valid lanes currently being incrementally grown, wherein:
   the first valid lane buffer is populated with the collection of valid lanes currently being incrementally grown when a most recent incrementally grown collection of valid lanes is stored in the second valid lane buffer; and
   the second valid lane buffer is populated with the collection of valid lanes currently being incrementally grown when the most recent incrementally grown collection of valid lanes is stored in the first valid lane buffer.

7. The method of claim 1, further comprising alternately populating a first world model buffer and a second world model buffer with the plurality of keyframes, wherein:
   when the particular keyframe is stored in the second world model buffer, the first world model buffer is populated with a current keyframe of the plurality of keyframes that is currently being computed; and when the particular keyframe is stored in the first world model buffer, the second world model buffer is populated with the current keyframe.

8. The method of claim 1, wherein computing the plurality of keyframes at the first frequency as opposed to the second frequency is such that a compression ratio of computing the plurality of keyframes is based at least on a speed of the vehicle and is at least 10:1.

9. The method of claim 1, wherein computing the plurality of keyframes at the first frequency as opposed to the second frequency is such that a compression ratio of computing the plurality of keyframes is based at least on a speed of the vehicle and is at least 40:1.

10. A processing system comprising:
one or more processors configured to perform operations comprising:
determining, at a first frequency and based at least on map data, a plurality of keyframes corresponding to a world model that is representative of one or more areas around a vehicle; and
generating, at a second frequency greater than a first frequency, a plurality of world model frames corresponding to the world model based at least on a particular keyframe of the plurality of keyframes and a plurality of localization results determined with respect to the vehicle, the generating of individual world model frames of the plurality of world model frames including spatially transforming the particular keyframe to a coordinate frame of reference of the vehicle based at least on an individual localization result of the plurality of localization results.

11. The system of claim 10, wherein spatially transforming the particular keyframe to the coordinate frame of reference comprises spatially transforming the particular keyframe to the coordinate frame of reference according to one or more spatial transformations determined over time and according to the second frequency.

12. The system of claim 10, wherein the plurality of keyframes are determined based at least on a plurality of lane graphs.

13. The system of claim 12, the operations further comprising, generating the plurality of lane graphs based at least on one or more portions of the map data that correspond to a plurality of portions of a high definition (HD) map, wherein the generating comprises incrementally growing a collection of valid lanes around the vehicle based at least on the one or more portions of the map data.

14. The system of claim 13, wherein incrementally growing the collection of valid lanes around the vehicle comprises, for at least two sequential time frames in a plurality of time frames includes:
retaining in the collection at least one lane from a preceding time frame that remains within a horizon of the vehicle, the horizon being represented as a perimeter of a predefined area centered on the vehicle;
adding to the collection each lane newly within the horizon; and
removing from the collection at least one lane retained in or added to the preceding time frame that is no longer within the horizon.

15. The method of claim 13, the operations further comprising alternately populating a first valid lane buffer and a second valid lane buffer with a collection of valid lanes currently being incrementally grown, wherein:
the first valid lane buffer is populated with the collection of valid lanes currently being incrementally grown when a most recent incrementally grown collection of valid lanes is stored in the second valid lane buffer; and
the second valid lane buffer is populated with the collection of valid lanes currently being incrementally grown when the most recent incrementally grown collection of valid lanes is stored in the first valid lane buffer.

16. The system of claim 10, the operations further comprising alternately populating a first world model buffer and a second world model buffer with the plurality of keyframes, wherein:
when the particular keyframe is stored in the second world model buffer, the first world model buffer is populated with a current keyframe of the plurality of keyframes that is currently being computed; and
when the particular keyframe is stored in the first world model buffer, the second world model buffer is populated with the current keyframe.

17. The system of claim 10, wherein computing the plurality of keyframes at the first frequency as opposed to the second frequency is such that a compression ratio of computing the plurality of keyframes is based at least on a speed of the vehicle and is at least 10:1.

18. The system of claim 10, wherein computing the plurality of keyframes at the first frequency as opposed to the second frequency is such that a compression ratio of computing the plurality of keyframes is based at least on a speed of the vehicle and is at least 40:1.

19. A processor comprising:
processing circuitry configured to perform operations comprising:
determining, at a first frequency and based at least on map data, a plurality of keyframes corresponding to a world model that is representative of one or more areas around a vehicle; and
generating, at a second frequency greater than a first frequency, a plurality of world model frames corresponding to the world model based at least on a particular keyframe of the plurality of keyframes and a plurality of localization results determined with respect to the vehicle, the generating of individual world model frames of the plurality of world model frames including spatially transforming the particular keyframe to a coordinate frame of reference of the vehicle based at least on an individual localization result of the plurality of localization results.

20. The system of claim 19, the operations further comprising, generating a plurality of lane graphs based at least on one or more portions of the map data that correspond to a plurality of portions of a high definition (HD) map, wherein:
the generating comprises incrementally growing a collection of valid lanes around the vehicle based at least on the one or more portions of the map data; and
the plurality of keyframes are determined based at least on the plurality of lane graphs.

\* \* \* \* \*